United States Patent
Okada et al.

(10) Patent No.: US 7,521,133 B2
(45) Date of Patent: Apr. 21, 2009

(54) TITANIUM OXIDE PHOTOCATALYST, PROCESS FOR PRODUCING THE SAME AND APPLICATION

(75) Inventors: Katsumi Okada, Nara (JP); Katsuhiro Nishihara, Amagasaki (JP); Yasuhiro Masaki, Osaka (JP); Haruhiko Kajimura, Kobe (JP); Michiyasu Takahashi, Nishinomiya (JP); Tadashi Yao, Amagasaki (JP); Tadashi Ogasawara, Nishinomiya (JP); Munetoshi Watanabe, Suita (JP); Shiji Shimosaki, Amagasaki (JP); Kouji Oda, Kobe (JP); Sadanobu Nagaoka, Kobe (JP)

(73) Assignees: Osaka Titanium Technologies Co., Ltd., Hyogo (JP); Sumitomo Metal Industries, Ltd., Osaka (JP)

( * ) Notice: Subject to any disclaimer, the term of this patent is extended or adjusted under 35 U.S.C. 154(b) by 285 days.

(21) Appl. No.: 10/508,871

(22) PCT Filed: Mar. 20, 2003

(86) PCT No.: PCT/JP03/03401

§ 371 (c)(1),
(2), (4) Date: May 25, 2005

(87) PCT Pub. No.: WO03/080244

PCT Pub. Date: Oct. 2, 2003

(65) Prior Publication Data
US 2005/0227008 A1 Oct. 13, 2005

(30) Foreign Application Priority Data

| Mar. 25, 2002 | (JP) | 2002-083222 |
| Nov. 5, 2002 | (JP) | 2002-321101 |
| Jan. 21, 2003 | (JP) | 2003-012492 |

(51) Int. Cl.
 *B32B 9/00* (2006.01)
 *C09D 1/00* (2006.01)
 *C04B 35/00* (2006.01)

(52) U.S. Cl. .............. 428/701; 428/702; 428/696; 106/286.4; 501/134

(58) Field of Classification Search ............... 428/696, 428/697, 699, 701, 702; 502/349, 350
See application file for complete search history.

(56) References Cited

U.S. PATENT DOCUMENTS 5,821,186 A * 10/1998 Collins ............... 502/8

(Continued)

FOREIGN PATENT DOCUMENTS

EP 1 066 878 A1 1/2001

(Continued)

OTHER PUBLICATIONS

Hiroyuki Noda, Kazuo Oikawa, Tateaki Ogata, Kenzo Matsuki and Hitoshi Kamada; Preparation Of Titanium (IV) Oxides And Its Characterization; Nippon Kagaku Kaishi 8; pp. 1084-1097; (1986).

*Primary Examiner*—Timothy M Speer
(74) *Attorney, Agent, or Firm*—The Webb Law Firm

(57) ABSTRACT

Titanium oxide-based photocatalysts which contain a metal halide in titanium oxide and which are prepared from titanium oxide and/or its precursor, which may optionally be heat treated, by contact with a reactive gas containing a metal halide of the formula $MX_n$ or $MOX_n$ (wherein M=a metal, X=a halogen, and n=an integer) with heating stably develop a high photocatalytic activity with visible light irradiation. The photocatalysts may subsequently be stabilized by contact with water or by heat treatment, and/or promoted by contact with a heteropoly acid and/or an isopoly acid so as to include a metal complex in the titanium oxide. Photocatalysts prepared in this manner exhibit novel ESR features. The present invention also provides methods for preparing these photocatalysts, a photocatalyst dispersion and a photocatalytic coating fluid containing such a photocatalyst, and photocatalytic functional products and methods for their manufacture using the photocatalyst.

19 Claims, 4 Drawing Sheets

U.S. PATENT DOCUMENTS

| | | | |
|---|---|---|---|
| 6,037,289 A * | 3/2000 | Chopin et al. | 502/2 |
| 6,071,623 A * | 6/2000 | Sugawara et al. | 428/428 |
| 6,103,363 A | 8/2000 | Boire et al. | |
| 2002/0077251 A1* | 6/2002 | Okusako et al. | 502/350 |
| 2002/0187338 A1* | 12/2002 | Tanaka et al. | 428/336 |

FOREIGN PATENT DOCUMENTS

| | | |
|---|---|---|
| JP | 07-275704 A | 10/1995 |
| JP | 09-025551 | 1/1997 |
| JP | 09-262482 | 10/1997 |
| JP | 10-113563 A | 5/1998 |
| JP | 10-146530 | 6/1998 |
| JP | 10-176238 | 6/1998 |
| JP | 10-265901 | 10/1998 |
| JP | 10-265926 | 10/1998 |
| JP | 2001-190953 | 7/2001 |
| JP | 2001-205103 | 7/2001 |
| JP | 2001-212457 | 8/2001 |
| JP | 2001-329383 | 11/2001 |
| JP | 2002-239395 A | 8/2002 |
| WO | WO 00/10706 | 3/2000 |
| WO | WO 01/56928 A1 | 8/2001 |
| WO | WO 01/71055 * | 9/2007 |

* cited by examiner

TITANIUM OXIDE PHOTOCATALYST, PROCESS FOR PRODUCING THE SAME AND APPLICATION

TECHNICAL FIELD

This invention relates to a titanium oxide-based photocatalyst which can exhibit a photocatalytic activity not only when irradiated with ultraviolet light but also when irradiated with visible light and to a method of preparing the same. The invention also relates to a photocatalytic functional product and a coating fluid containing such a photocatalyst and to a method of manufacturing the photocatalytic functional product.

BACKGROUND ART

In recent years, the photocatalytic activity of titanium oxide has been applied to various environmental depollution techniques including deodorization, prevention of microbial growth, and prevention of fouling. Anatase titanium oxide, which is commonly used as a photocatalyst, has a band gap of about 3.2 eV, and its photocatalytic reaction proceeds by the action of ultraviolet light having a wavelength of about 380 nm or shorter. Therefore, in order to develop its photocatalytic activity, it is necessary for the titanium oxide to be irradiated with ultraviolet light, which results in problems such as a limitation in places where the photocatalyst can be located and in the fields to which it can be applied.

If it becomes possible to use visible light, which plentiful in sunbeams and room lamps, as an energy source to activate a photocatalyst, the reactivity of the photocatalyst will be strengthened, and it will become possible to utilize a photocatalyst in various locations. For this reason, attempts have been made to develop photocatalytic materials capable of being activated by irradiation with visible light.

For example, JP-A 09-262482 (1997) discloses anatase $TiO_2$ having a visible light activity (i.e., capability of being activated by visible light) which is characterized by containing vanadium or chromium incorporated by means of ion implantation. A titanium oxide-based photocatalyst which is made responsive to visible light by incorporating nitrogen in the titanium oxide crystals is reported in JP-A 2001-205103, and one which is made responsive by introducing stable lattice defects into the titanium oxide crystals is reported in WO 00/10706.

The fact that a visible light photocatalytic activity occurs with titanium oxide having oxygen defects (lattice defects in the positions of oxygen) is described in Nippon Kagaku Kaishi 8, pp. 1084-1091 (1986) and JP-A 10-146530 (1998). Oxygen defects can be identified and quantified most effectively by measurement of an ESR (electron spin resonance) spectrum.

A photocatalyst made of titanium oxide which has oxygen defects and is activated by visible light irradiation is reported in Japanese Patent No. 3,252,136. That photocatalyst is characterized by an ESR spectrum in which a signal having a g-value range of 2.003-4 is observed when the spectrum is measured in the dark in a vacuum at 77 K, and the intensity of this signal is increased when the spectrum is measured under irradiation with visible light in a vacuum at 77K.

The titanium oxide photocatalyst reported in JP-A 2001-190953 has an ESR spectrum with at least three peaks in a g-value range of 1.903-2.030 (i.e., the range in which the g value is 1.903-2.030), and the highest peak among these peaks exists in a g-value range of 1.990-2.020.

The presence of foreign metal ions or defects in titanium oxide is effective at making the titanium oxide responsive to visible light, but on the other hand, it worsens the reproducibility of development of photocatalytic activity and may decrease the photocatalytic activity itself, since deactivation of a photocatalytic response which is accompanied by isolation of electrons and holes may originate from such ions and defects. Another problem of the conventional photocatalysts capable of responding to visible light including those which contain nitrogen is that their preparation requires a device for ion implantation or sputtering, and such a device is not suitable for use in mass production.

It is an object of the present invention to provide a photocatalyst which can stably exhibit a high visible light photocatalytic activity, a method for its preparation which is suitable for mass production, a photocatalytic functional product using the photocatalyst, a coating fluid which can be used to manufacture the photocatalytic functional product, and a method of manufacturing the photocatalytic functional product.

DISCLOSURE OF THE INVENTION

The present invention is based on the following findings (1) to (4):

(1) incorporation of a metal compound such as a metal halide into titanium oxide results in the development of photocatalytic activity by the action of visible light;

(2) when titanium oxide having a metal compound incorporated therein is treated by contact with water and/or heat treatment to convert the metal compound into a metal hydroxide or oxide, it still retains its visible light photocatalytic activity at a sufficient level for practical purposes while it is stabilized;

(3) when titanium oxide having a metal compound incorporated therein is treated by contact with a heteropoly acid and/or an isopoly acid, either directly or after the treatment with water and/or heat treatment, so as to incorporate a polynuclear metal complex therein, its photocatalytic activity is further increased; and (4) these materials show novel ESR spectra, so a material which exhibits a high visible light photocatalytic activity can be identified by its ESR spectrum.

The present invention provides a titanium oxide-based photocatalyst identified by any of the following (a) to (d) and preferably having the property described in the following (e).

(a) It comprises titanium oxide which contains a different metal compound and preferably a metal halide, a metal complex, a metal hydroxide, or a metal oxide, the photocatalyst exhibiting its photocatalytic activity by irradiation with visible light.

(b) It comprises titanium oxide which contains a metal halide and preferably a metal chloride, the photocatalyst having a thermal desorption spectrum in which a peak of a molecular ion or a fragment ion of a halogen-containing substance appears at a temperature of 623 K or higher.

(c) It exhibits its photocatalytic activity by irradiation with visible light and has an ESR spectrum measured at a temperature of at least 5 K in which a peak is observed in a g-value range of 1.950-2.030 (i.e., the range in which the g value is 1.950-2.030) when the spectrum is measured with visible light irradiation and that peak is not substantially observed when the spectrum is measured in the dark.

(d) It exhibits its photocatalytic activity by irradiation with visible light and has an ESR spectrum measured at room temperature in a substantially oxygen-free atmosphere in which the highest peak observed in a g-value range of 1.950-

2.030 when irradiated with visible light has a peak intensity with a half life of at least 3 minutes after the irradiation with visible light is stopped.

(e) It has an ESR spectrum measured at a temperature lower than 77K in which a peak appears in a g-value range of 1.986-1.994.

In the present invention, the term "visible light" indicates light having a wavelength of 400 nm or longer.

The identity of the metal compound or metal halide in the titanium oxide-based photocatalyst described in (a) or (b) above is not clearly known at present, but it contributes to the photocatalytic function through some interaction of a central metal ion or a coordinated (metal) ion included in the metal halide, hydroxide, oxide, or complex with titanium oxide.

Particularly when the titanium oxide is of the visible light absorbing type such as one containing a lower valence titanium ion ($Ti^{3+}$, $Ti^{2+}$), an oxygen-defective titanium oxide which contains oxygen defects, or a mixture of these, or when its response to visible light is conferred by incorporation of an element or ion other than Ti and oxygen, such as a chromium ion, an iron ion, a vanadium ion, nitrogen, sulfur, or chlorine, the above-described interaction is increased, and the photocatalyst has an increased activity. Therefore, such titanium oxide is preferred.

In the case where the metal compound is a metal complex, it is preferably a polynuclear metal complex such as a heteropoly acid or an isopoly acid. In this case, it is very advantageous that the titanium oxide is of an oxygen-defective type due to the activity of the photocatalyst which can be further increased.

In the case of a metal complex with a halogen ligand, there is the possibility of the halogen ligand interacting with titanium oxide. When the metal compound is a metal halide, it is particularly preferable that at least part of the metal halide be chemically bonded to the surface of the titanium oxide.

The present invention also provides methods of preparing the above-described titanium oxide-based photocatalyst.

A first method comprises bringing titanium oxide and/or its precursor into contact with a reactive medium containing a metal halide of the formula $MX_n$ or $MOX_n$ (wherein M=a metal, X=a halogen, and n=an integer). This method can be used to readily prepare a titanium oxide-based photocatalyst which is defined by any of (a)-(c) and (e) above with good reproducibility.

A second method comprises subjecting the product obtained by contact with the reactive medium in the first method to post-treatment by contact with water and/or by heat treatment. This post-treatment can be used to prepare a titanium oxide-based photocatalyst defined by (d) above.

A third method comprises further subjecting the product obtained by contact with the reactive medium by the first method or obtained by post-treatment comprising contact with water and/or heat treatment by the second method to contact with a heteropoly acid and/or an isopoly acid. This method can be used to prepare a titanium oxide-based photocatalyst containing a metal complex.

In order to obtain a titanium oxide-based photocatalyst having a further increased activity in any of the above-described methods, it is preferred to subject the titanium oxide and/or its precursor to heat treatment at 323-823 K or wet processing as pretreatment before contact with the reactive medium.

A titanium oxide-based photocatalyst according to the present invention can be used in various forms such as a powder, film (including thin film), fiber, and the like. In particular, a substrate having the titanium oxide-based photocatalyst deposited or fixed on the surface thereof (in the form of a film, for example) can be used as a photocatalytic functional product having a photocatalytic activity.

A preferable photocatalytic functional product has a film comprising the above-described titanium oxide-based photocatalyst and a binder component on the surface of a substrate, the film containing 5-95 mass % of the titanium oxide-based photocatalyst.

The present invention further provides a dispersion and a coating fluid containing the photocatalyst which can be used to manufacture the photocatalytic functional product.

A photocatalytic functional product according to the present invention can be manufactured by a method comprising applying the coating fluid to the surface of a substrate.

In another method, a photocatalytic functional product can be manufactured by depositing titanium oxide and/or its precursor on the surface of a substrate followed by bringing the surface into contact with a reactive medium containing a metal halide of the formula $MX_n$ or $MOX_n$ (wherein M, X, and n are as indicated above).

DESCRIPTION OF EMBODIMENTS OF THE INVENTION

Figure 1:
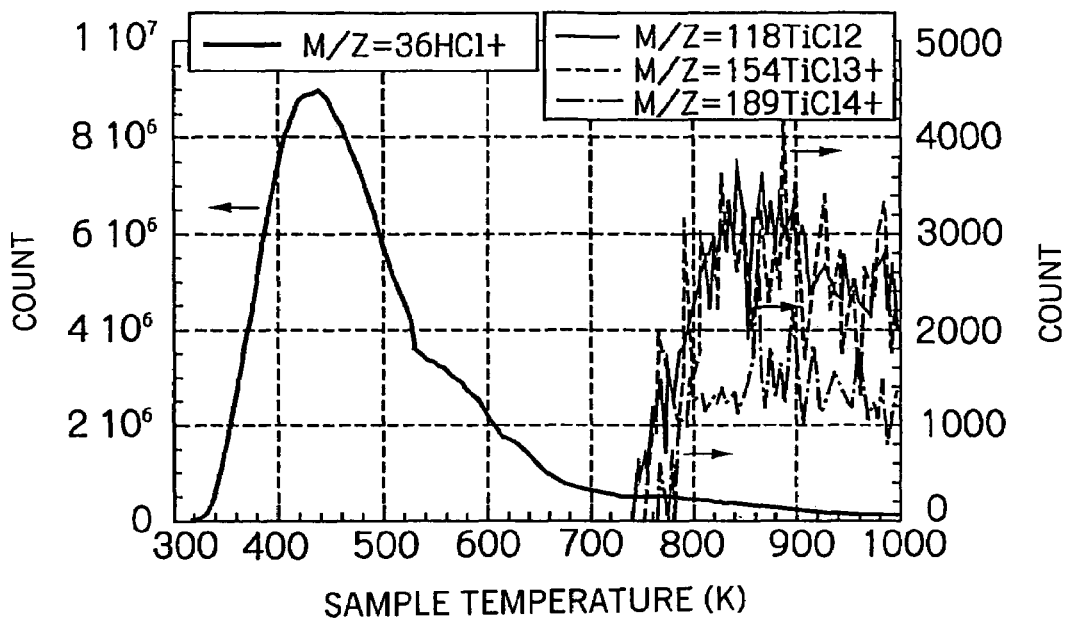
FIG. 1 shows a thermal desorption spectrum (TDS) of a titanium oxide-based photocatalyst according to the present invention which was prepared in Example 2(a).

A titanium oxide-based photocatalyst according to the present invention develops its photocatalytic activity by the action of visible light. As described earlier, the term "visible light" means radiation having a wavelength of 400 nm or longer.

A conventional titanium oxide-based photocatalyst does not develop its photocatalytic activity with light having a wavelength of 390 nm or longer, so it will not exhibit any substantial photocatalytic activity when irradiated with visible light. In contrast, a titanium oxide-based photocatalyst according to the present invention exhibits its photocatalytic activity when irradiated with visible light. Of course, it also functions as a photocatalyst when irradiated with ultraviolet light. In addition, it exhibits its photocatalytic activity when irradiated with near ultraviolet light having a narrow wavelength range of 390-400 nm. This is another different property which is not found in a conventional titanium oxide-based photocatalyst. These unique photocatalytic properties are observed commonly with all photocatalysts according to various embodiments of the present invention which will be described below.

In one aspect, a titanium oxide-based photocatalyst capable of developing its photocatalytic activity by irradiation with visible light according to the present invention contains a different metal compound (namely, a metal compound other than titanium oxide) in titanium oxide.

The "different metal compound" may be present either inside or outside the titanium oxide particles, or both inside and outside the particles. The metal compound includes a metal halide, a metal hydroxide, a metal oxide, a metal complex, and the like. Other metal compounds may be used provided that their presence causes the titanium oxide to exhibit visible light photocatalytic activity. In the case of a metal halide or a metal hydroxide, at least part of the compound is preferably bonded to the surface of titanium oxide by a chemical reaction. For example, a metal halide can be bonded to the surface of titanium oxide by reacting with the hydroxyl groups existing on the surface of titanium oxide to cause a dehydrohalogenation reaction. Alternatively, the metal halide may be partly bonded to the surface of titanium oxide in this manner and partly adsorbed by that surface.

The metal halide which is present in a titanium oxide-based photocatalyst according to the present invention may be in the form of a metal halide such as titanium tetrachloride itself, which is generally represented by $MX_n$ (wherein M=a metal, X=a halogen, and n=an integer). However, the metal halide is usually chemically bonded to the surface of titanium oxide and thus converted into the form of —O-M-$X_n$ (wherein O is oxygen from the surface of titanium oxide), which is formed by partial dehydrohalogenation of the metal halide, or into the form —O-M-$(L)_m X_{n'}$ (wherein L is a ligand such as oxo (O), hydroxyl, ammine (ammonia), an alkylamine, an alkylphosphine, phenylphosphine, an alkyl, acetate, carbonyl, or a nitrogen-containing heterocyclic group such as pyridyl and piperidyl, m is an integer, and n' is zero or an integer), which is formed when the residual halogen of —O-M-$X_n$ further undergoes hydrolysis or another reaction. The metal halide may be converted into a metal hydroxide in which all of the halogens X of the halide are converted into hydroxyl groups by hydrolysis, or it may be converted into a metal oxide in which the metal hydroxide further undergoes dehydration (condensation) to form a metal oxide network.

The halogen may be a single element selected from fluorine, chlorine, bromine, and iodine, or it may be a mixture of two or more of these elements. Chlorine is particularly preferred since it can confer the highest photocatalytic activity.

The metal compound may be a halogen-free compound such as a metal complex. The metal complex which exists in titanium oxide may be either in the form of a metal complex itself which is generally represented by $ML_n$ (wherein M=a metal, L=a ligand, n=an integer) or in a form such as —O-M $(L)_n$ derived from the complex when it is chemically bonded to the surface of titanium oxide.

Examples of the ligand L are oxo (O, oxygen), hydroxyl, ammine (ammonia), an alkylamine, an alkylphosphine, phenylphosphine, an alkyl, acetate, carbonyl, and a nitrogen-containing heterocyclic group such as pyridyl and piperidyl. When a plurality of ligands are present, they may be the same or different from each other.

The metal compound may also be a compound such as a polynuclear metal complex which contains a plurality of metals which may be the same or different from each other. It is also possible to include two or more different metal compounds in titanium oxide. Among polynuclear metal complexes, a heteropoly acid (anion) and an isopoly acid (anion) which are oxo acid-type polynuclear metal complexes are preferred because of their ability to confer an increased visible light photocatalytic activity. Examples of a heteropoly acid include $PW_{12}O_{40}^{3-}$, $SiW_{12}O_{40}^{3-}$, and $PMo_{12}O_{40}^{3-}$. Examples of an isopoly acid include $Mo_7O_{24}^{6-}$ and $W_7O_{24}^{6-}$. The counter cations of these anions may be protons or other cations such as $Cs^+$ or $NH_4^+$. They may be either chemically bonded to the surface of titanium oxide or merely adsorbed by that surface.

Regardless of whether the metal compound is a metal halide, a metal hydroxide, a metal oxide, or a metal complex, examples of the metal M include Ti, Sr, Zr, Al, B, C, P, Mg, Sc, Cr, Co, Zn, Hf, Fe, Sb, W, V, Sn, Bi, Mn, Mo, Cs, Ge, As, and Ce. Of these, P, Si, W, Mo, Cs, Ge, As, and Ce are metals which are preferred when the metal compound is a metal complex of the heteropoly acid or ixopoly acid type. In particular, a high photocatalytic activity is obtained when the metal M is at least one metal selected from Ti, Si, V, Sn, Sb, W, Nb, Bi, P, Mo, Cs, Ge, As, and Ce, and thus such metals are preferred.

The content of the metal compound in titanium oxide is preferably at least 0.1 mass % and at most 300 mass % as metal based on the mass of titanium oxide. A content of less than 0.1 mass % may be insufficient to confer to titanium oxide the desired photocatalytic activity developed with visible light. If the content of the metal compound is excessive, the properties of the metal compound appear strongly, leading to a decrease in photocatalytic activity. When the metal compound is a metal halide introduced into titanium oxide by the below-mentioned contact treatment or a metal hydroxide or oxide formed by decomposition (hydrolysis or thermal decomposition) of the halide, it is difficult for the metal compound to be included in titanium oxide in an amount larger than 10 mass %. Therefore, in such a case, the upper limit of the content of the metal compound is generally on the order of 10 mass %, although a higher content is acceptable if it is possible. When the metal compound is a heteropoly acid or an isopoly acid, it can be introduced into titanium oxide in a much higher amount. However, a content thereof in excess of 300 mass % causes a significant decrease in photocatalytic activity.

The above-described titanium oxide-based photocatalyst which contains a metal halide is characterized by a thermal desorption spectrum (also called TDS or TPD spectrum) measured by temperature-programmed desorption gas spectrometry in which a peak of a molecular ion or a fragment ion of a halogen-containing substance appears in a temperature range above 573 K.

Measurement of a thermal desorption spectrum is carried out by measuring the spectrum of gases which are desorbed from a sample by use of a mass spectrograph while the temperature of the sample is elevated at a constant rate by infrared heating or other heating method after the sample has been thoroughly dried and then exhausted to about $10^{-6}$-$10^{-9}$ Torr. The measurement of the temperature is preferably performed on the surface of the sample for accurate identification. A molecular ion or fragment ion normally has a plurality of peaks in a thermal desorption spectrum.

Even if titanium oxide contains a halogen, when all the peaks of a molecular ion or a fragment ion of a halogen-containing substance observed in a thermal desorption spectrum appear in a temperature range lower than 573 K, the interaction of the halogen or halogen-containing substance with titanium oxide is weak, resulting in an extremely weak photocatalytic activity, so such a material will not substantially function as a photocatalyst with visible light. Titanium oxide having at least one peak in a temperature range above 573 K in a thermal desorption spectrum can be expected to exhibit a high photocatalytic activity with visible light. The peak is preferably in a temperature range above 623 K. In such a case, the photocatalytic activity with visible light is further increased.

With respect to the case where the halogen is chlorine, non-limiting examples of a metal halide having a peak of a molecular ion or a fragment ion above 573 K in a thermal desorption spectrum include titanium chlorides, titanium oxychloride, and a polymer of these. All the metal halides exemplified above have a peak at a temperature above 623 K.

In another aspect of the present invention, a titanium oxide-based photocatalyst which exhibits visible light photocatalytic activity according to the present invention has an ESR spectrum with novel features.

Specifically, in a first feature, at least one peak is observed in an ESR spectrum measured with irradiation by visible light at a temperature of at least 5 K in a g-value range of 1.950-2.030, and this peak is not substantially observed in an ESR spectrum measured in the dark. The expression "not substantially observed" indicates that the peak is lower than the limit of detection of the ESR measuring apparatus. Some photocatalysts according to the present invention show the first feature of an ESR spectrum throughout a temperature range of from 5 K to room temperature. Other photocatalysts show the first feature only at a low temperature of 5K or in the vicinity thereof and no longer show it at room temperature.

Irradiation with visible light for measurement of ESR spectra can be performed using a halogen lamp or a xenon lamp and is preferably continued for at least 1 minute. If the irradiated light includes a considerable amount of ultraviolet rays, the peak intensities of an ESR spectrum are decreased, so it is preferable to irradiate only visible light consisting substantially of rays having a wavelength of 400 nm or longer by filtering the light, if necessary. For the first feature, the atmosphere for ESR measurement is not limited. Thus, whether the measurement atmosphere is air, an inert gas, or a vacuum, the ESR spectrum shows the first feature.

Measurement of an ESR spectrum in the dark is conducted in light-shielding conditions after a titanium oxide-based photocatalyst to be measured is stored in the dark or in light-shielding conditions for at least 3 days at the same temperature as that of the ESR measurement whether the photocatalyst has a history of irradiation with light or not. Subsequent to this measurement in the dark, if the photocatalyst is irradiated with visible light and its ESR spectrum is measured, the resulting spectrum has an ESR peak in a g-value range of 1.950-2.030, which peak does not appear in the ESR spectrum measured in the dark.

Some titanium oxide-based photocatalysts having an ESR spectrum with the above-described first feature show a second feature in an ESR spectrum measured at room temperature in a substantially oxygen-free atmosphere in which the highest peak observed in a g-value range of 1.950-2.030 when irradiated with visible light has a peak intensity with a half life of at least 3 minutes after the irradiation with visible light is stopped. A photocatalyst having visible light activity can be identified only by the presence of the second feature in its ESR spectrum. The half life of the intensity of this peak after extinction is preferably at least 4 minutes for further increasing the photocatalytic activity. Since the intensity of a peak in an ESR spectrum is generally indicative of the concentration of an active species, the half life of the intensity of a peak generally corresponds to the period elapsed until the concentration of an active species decreases to a half its initial concentration.

The term "substantially oxygen-free" indicates that the atmosphere has an oxygen partial pressure of at most 0.1 Torr. The atmosphere may be either a vacuum or a pure inert gas. The second feature can be seen when an ESR spectrum is measured at room temperature in such an atmosphere.

Peaks in an ESR spectrum with a g-value in the range of 1.950-2.030 constitute a triplet signal (having three peaks), and this signal is considered to be attributable to an active species in which oxygen defects participate, as discussed in the Japanese article Catalyst 9 (the 21st proceeding), pp. 45-48 (1963). The active species plays the major role in visible light photocatalytic reaction.

The active species can be present both inside titanium oxide particles and on the surface thereof, and in either case, it is attenuated (extinguished) and decayed by recombination or by a reaction with a substance such as oxygen. The above-described first feature in an ESR spectrum indicates that the decay of the active species is very fast in the presence of oxygen. From this, it is presumed that a photocatalyst according to the present invention has a structure in which the active species readily reacts with oxygen, for example, it is mostly located on the surface of titanium oxide. Therefore, when the photocatalyst is made to function in normal conditions, namely, in an oxygen-containing atmosphere (typically in air), it exhibits a very high photocatalytic activity by irradiation with visible light due to a prompt reaction with oxygen of the active species formed by irradiation with visible light.

On the other hand, the second feature in an ESR spectrum that the intensity of the highest peak of the triplet signal has a half life of at least 3 minutes when the spectrum is measured at room temperature in a deoxidized atmosphere indicates that the decay of the above-described active species, which plays the major role in a visible light photocatalytic reaction, is very slow in a deoxidized atmosphere. Since any reaction with oxygen cannot occur under such conditions, it is thought that the active species which gives the highest peak intensity and which exists inside the particles or on the surface thereof has a structure which is essentially difficult to recombine.

As a result, with a photocatalyst having the second feature in addition to the first feature, the active species formed by irradiation with visible light preferentially reacts with oxygen in an oxygen-containing atmosphere with little deactivation which can occur inside the titanium oxide particles or the surface thereof, and the photocatalytic reaction proceeds sequentially in an efficient manner so that the visible light photocatalytic activity continues.

It is preferable that a titanium oxide-based photocatalyst having the above-described first and second features further have a third feature, which is an ESR spectrum measured at a temperature lower than 77K in which a peak appears in the very narrow g value range of 1.986-1.994. As a result, it has a further increased photocatalytic activity. The third feature is observed whether the atmosphere of ESR spectrum measurement is air, a vacuum, or an inert gas. The temperature of measurement is lower than 77 K, preferably lower than 30 K, and more preferably 5 K. The lower the temperature, the higher the peak.

The structure of titanium oxide in a titanium oxide-based photocatalyst according to the present invention may be either amorphous or crystalline, or it may be partially crystalline. When it includes a crystalline structure, the crystal form may be any of anatase, rutile, and brookite, or it may be a mixture of these. In order to achieve the highest visible light photocatalytic activity, the major crystal form of titanium oxide is desirably anatase.

The titanium oxide is preferably of a type which absorbs visible light, such as titanium oxide containing lower valence titanium ions, oxygen-defective titanium oxide, or a mixture of these. Oxygen-defective titanium oxide is particularly preferred. Whether the titanium oxide constituting a photocatalyst has visible light absorptivity can be determined by whether the photocatalyst assumes a color. When the titanium oxide is of the visible light-absorbing type, most of the energy of sunbeams and artificial light sources (such as fluorescent tubes and halogen lamps) can be used to decompose organic substances (such as pollutants and harmful substances), and thus the reaction efficiency is increased compared to a conventional photocatalyst activated by ultraviolet light. In particular, in the case of using a heteropoly acid or an isopoly acid as a metal compound included in the photocatalyst, if the titanium oxide is of the oxygen-defective type, a titanium oxide-based photocatalyst having a very high visible light photocatalytic activity can be achieved.

When titanium oxide including lower valence titanium ions, oxygen-defective titanium oxide, or a mixture of these is generally represented by the formula $TiO_{(2-Y)}$, the value of Y is preferably $0.5>Y>0$. If Y is greater than 0.5, it becomes almost impossible to achieve a photocatalytic activity with titanium oxide containing a metal compound.

It is also possible to apply the present invention to titanium oxide to which visible light responding ability is imparted by another technique (such as incorporation of Cr, Fe, or V ions), thereby increasing the visible light responding ability of the titanium oxide.

A titanium oxide-based photocatalyst according to the present invention can be prepared by a method comprising bringing titanium oxide or its precursor into contact with a reactive medium containing a metal halide of the formula $MX_n$ or $MOX_n$ (wherein M=a metal, X=a halogen, and n=an integer and more specifically n=the valence number of the metal in the case of $MX_n$ and n=[the valence number minus 2] in the case of $MOX_n$), and optionally followed by contact with water and/or heat treatment.

The raw material which is used in this method is titanium oxide, a titanium oxide precursor, or a mixture of both. The "titanium oxide precursor" means a compound which is converted into titanium oxide in its major structure upon heating. Specific examples of a titanium oxide precursor include titanium hydroxide, hydrated titanium oxide, titanium oxychloride, and a partial hydrolysate of a titanium alkoxide.

When the raw material is titanium oxide, its structure may be either amorphous or crystalline, or it may be a mixture of these. In the case of a raw material containing crystalline titanium oxide, the crystal form may be anatase, rutile, or a mixture of these. For the purpose of obtaining titanium oxide having a high photocatalytic activity, it is desirable to use anatase titanium oxide as a raw material, and a more desirable raw material is anatase titanium oxide containing some amorphous moieties which still remain therein. As mentioned before, the raw material may be titanium oxide having visible light responding ability provided by another technique.

The titanium oxide or its precursor which is used as a raw material may be either a commercially available product or a prepared product formed by a reaction, but the use of a prepared product is preferred. The prepared product can be obtained by, for example, hydrolyzing an aqueous solution or a solution in an organic solvent of a titanium compound such as a titanium alkoxide, titanyl sulfate, titanium sulfate, or titanium tetrachloride in the presence of water, an acid, or a base followed by calcinating the hydrolysate, if necessary, or by calcinating a titanium compound in an oxygen-containing atmosphere.

The raw material which is used in the present invention is preferably titanium oxide and/or its precursor prepared by a process comprising hydrolyzing at least one titanium compound selected from titanyl sulfate, titanium sulfate, and titanium tetrachloride in the presence of a nitrogen-containing base (i.e., ammonia or an amine). This makes it possible to obtain a more active titanium oxide-based photocatalyst. The titanium compound used as a raw material can be subjected to hydrolysis either as is or in aqueous solution, but the use of an aqueous solution is desirable from the standpoint of handling.

Titanium oxide and/or its precursor is brought into contact with a reactive medium which contains a metal halide. The reactive medium may be either gaseous or liquid, but in order to distribute a metal halide uniformly on the titanium oxide, the use of a gaseous medium is desirable. The following description will be made mainly with respect to the case in which a gaseous reactive medium (hereinafter referred to as a reactive gas) is used.

The contact of titanium oxide and/or its precursor with a reactive gas may be performed at room temperature, but preferably it is done at an elevated temperature. A preferable temperature for this contact is at least 323 K and at most 873 K. If the temperature is outside this range, it may be made impossible to impart adequate visible light responding ability to titanium oxide. A more preferred temperature range is at least 473 K and at most 673 K.

The duration of contact with the reactive gas varies depending on the temperature. It is at least 1 minute and at most several hours. For commercial operation, the duration is desirably within 120 minutes. For example, in the case of the temperature of contact being 573 K, a photocatalyst having adequate performance can be obtained if the duration of contact is from 5 to 40 minutes.

As described previously, the metal halide which is present in the reactive gas is a compound of the formula $MX_n$ or $MOX_n$. The metal M in the formula $MX_n$ may be any metal capable of forming a liquid or gaseous halide in the above-described temperature range for contact such as Ti, Si, Zr, Al, B, C, P, Mg, Sc, Cr, Co, Zn, Hf, Fe, Sb, W, V, Sn, Bi, and Mn. An example of a compound of the formula $MOX_n$ is $VOCl_3$. The halogen X may be any of F, Cl, Br, and I, but as described earlier, it is preferably Cl from the standpoint of photocatalytic activity.

Preferable metal halides are $TiCl_4$, $VOCl_3$, $SnCl_4$, $SbCl_5$, $SiCl_4$, $WCl_6$, and $BiCl_3$. The use of a reactive gas which contains one or more of these halides allows the preparation of a titanium oxide-based photocatalyst having a high visible light activity.

In particular, $TiCl_4$ is the most preferred in view of availability, ease of handling, and ability to prepare a photocatalyst having a high activity with visible light. $TiCl_4$ is liquid at room temperature and has a relatively high vapor pressure, so it is readily vaporized to prepare a reactive gas.

The metal halide, when allowed to contact with titanium oxide at an elevated temperature, is bound by the surface of the titanium oxide, and at the same time it can reduce the titanium oxide matrix to introduce oxygen defects therein, thus converting the titanium oxide into one capable of absorbing visible light. This effect is particularly significant when a base gas (dilution gas) of the reactive gas contains hydrogen and/or nitrogen, and a photocatalyst having an increased visible light activity can be obtained.

The reactive gas is generally a mixed gas of a metal halide and a base gas (e.g., a carrier gas used for vaporization of the metal halide by bubbling). The base gas is preferably one or more gases selected from non-oxidizing gases such as hydrogen, nitrogen, argon, carbon monoxide, and ammonia. However, it may contain oxidizing gases such as oxygen and/or steam insofar as their total amount is at most 3 vol %. In this case, attention should be paid to side reactions between a non-oxidizing gas and an oxidizing gas.

It is preferable that at least part of the base gas be constituted by hydrogen and/or nitrogen since, as described above, a photocatalyst having an increased photocatalytic activity can be obtained if the base gas contains at least one of hydrogen and nitrogen.

The content of the metal halide in the reactive gas is limited by the temperature of the gas and the vapor pressure of the compound. In general, it is preferably at most 10 vol %. Even if it is made higher than 10 vol %, there is no significant difference in the properties of the resulting titanium oxide-based photocatalyst, and the yield is decreased, which is disadvantageous from the viewpoint of economy.

As described previously, the reactive medium may be liquid. Even in such a case, it is possible to obtain a titanium oxide-based photocatalyst having visible light photocatalytic activity. The liquid reactive medium is generally a solution of a metal halide dissolved in a solvent. Examples of a suitable solvent are hydrocarbons such as hexane, heptane, and benzene; tetrahydrofuran, dioxane, and DMF, although it is not limited to these. Titanium oxide and/or its precursor is added to a solution of a metal oxide and heated, if necessary, resulting in the formation of a photocatalyst according to the present invention which contains a metal halide. After it is recovered from the liquid reactive medium, the titanium oxide and/or its precursor is dried with heating, if necessary, to allow the solvent to evaporate. Then, it may be further subjected to the undermentioned post-treatment and particularly heat treatment. When the raw material is a titanium oxide precursor, it is converted to titanium oxide by such heat treatment.

Before the raw material which is titanium oxide and/or its precursor is brought into contact with a reactive medium containing a metal halide and preferably a reactive gas as described above, the raw material may be subjected to heat treatment as pretreatment. Pretreatment by heat of titanium oxide or its precursor which is used as a raw material causes removal of water from the surface of the raw material, crystallization of the material, or modification of surface functional groups, which favorably affects the reaction of the raw material with the metal halide during contact with the reactive medium. As a result, a photocatalyst having an increased activity can be obtained.

The temperature for such heat treatment performed as pretreatment is preferably at least 323 K and at most 823 K and more preferably at least 373 K and at most 673 K. The atmosphere for this heat treatment is not limited, and the heat treatment may be performed in a vacuum, in air, in an atmosphere of an inert gas such as nitrogen or argon, or in ammonia. The duration of this heat treatment varies depending on the temperature, but usually it is preferably between about 30 minutes and about 120 minutes. When the raw material is a titanium oxide precursor, it may be converted into titanium oxide during pretreatment by performing the heat treatment for pretreatment in air.

The pretreatment of the raw material may be effected by wet processing rather than heat treatment. The wet processing may be performed not only at atmospheric pressure but also at an elevated pressure and temperature in an autoclave (i.e., by hydrothermal treatment). The wet processing is preferably performed using an aqueous solution containing a nitrogen-containing substance such as ammonia, an ammonium salt, an amine, or hydrazine, thereby making it possible to obtain a highly active photocatalyst. The temperature for wet processing can be from room temperature to about 473 K and preferably is in the range of from 373 K to 473 K. Usually, the duration of processing is preferably 120 minutes or longer.

The raw material which is titanium oxide and/or its precursor and which may optionally have been pretreated in the above-described manner is brought into contact with a reactive medium containing a metal halide, thereby resulting in the preparation of a titanium oxide-based photocatalyst according to the present invention in which a different compound is included in titanium oxide. The photocatalyst exhibits a very high visible light photocatalytic activity. The photocatalyst has an ESR spectrum which shows the above-described first feature when measured at 5 K and preferably also shows the above-described third feature. In addition, the photocatalyst preferably has the above-described thermal desorption spectrum.

The titanium oxide-based photocatalyst prepared by the above-described method may be subjected to post treatment by contact with water and/or by heat treatment. Contacting titanium oxide and/or its precursor with a reactive medium containing a metal halide causes a chemical reaction to occur between functional groups (such as hydroxyl groups) existing on the surface of the titanium oxide or its precursor and the metal halide. Thus, the resulting photocatalyst includes a halogen-containing reaction product attached to the surface thereof and in some cases further includes hydrogen chloride formed as a by-product or unreacted metal halide adsorbed by the surface.

The post treatment causes decomposition or removal of the halogen-containing substances attached to or adsorbed by the surface of titanium oxide and conversion of the metal compound or compounds included in the titanium oxide to another metal compound or compounds such as a hydroxide and/or oxide, thus stabilizing the photocatalyst. However, the visible light photocatalytic activity of the photocatalyst is decreased by the post treatment. Nevertheless, a titanium oxide-based photocatalyst prepared by the above-described method retains its visible light photocatalytic activity at a level high enough for practical use even after being subjected to such post treatment. In addition, the post treatment makes the photocatalyst chemically stable and easy to handle, so from a practical standpoint, it is preferable to subject the photocatalyst to post treatment.

When the metal halide included in the reactive medium is a titanium halide, the metal compound included in the resulting photocatalyst is converted into titanium hydroxide or oxide during post treatment, and the photocatalyst no longer contains a halogen. It is difficult to distinguish the resulting halogen-free post-treated product from a conventional titanium oxide by chemical composition. However, the oxygen defects introduced by a reaction during contact with the reactive medium still remain in the post-treated product and make the product show an ESR spectrum which is different from that of a conventional titanium oxide, thereby making it possible to identify a photocatalyst according to the present invention by an ESR spectrum. Thus, whereas a conventional titanium oxide gives an ESR spectrum which does not show any of the above-described first to third features, an ESR spectrum of a post-treated product according to the present invention shows the first and the second features and preferably also the third feature. In addition, it shows the first feature in a wide temperature range of from 5 K to room temperature.

Post treatment can be performed by contact with water and/or by heat treatment. Although either treatment alone has an adequate effect, both treatments may be performed sequentially. In this case, the order of treatment is not limited.

Post treatment of the photocatalyst by contact with water results in hydrolysis of halogen-containing substances which are chemically bonded to the surface of the photocatalyst as well as removal of halogen-containing adsorbates by washing off from that surface. The contact with water can be performed by placing the photocatalyst into water and allowing the resulting mixture to stand or stirring it. Another method such as spraying the photocatalyst with water may be employed. The water which is used may be just water, or it may contain a suitable ingredient such as a base (e.g., a nitrogen-containing base such as ammonia and an amine) in water. After treatment, the recovered photocatalyst is preferably dried.

When a coating fluid, which is described later, is prepared, if water is used as a dispersing medium, the photocatalyst is brought into contact with water, so it is necessarily subjected to post treatment by contact with water. However, since that treatment is accompanied by release of halogen-containing substances to the coating fluid, the post treatment is preferably performed separately before preparation of the coating fluid.

Post treatment by heat treatment causes the halogen-containing substances bonded to or adsorbed by the surface of the photocatalyst to be removed by thermal decomposition or evaporation. Such heat treatment may also cause crystallization of titanium oxide to proceed, thereby leading to an increased activity of the photocatalyst. The temperature for heat treatment is preferably in the range of 373-873 K, since if it is outside this range, the above results of heat treatment may not be achieved significantly. A more preferable temperature range is between 473 K and 673 K. The atmosphere for heat treatment may be air, an inert gas, or a vacuum. The duration of heat treatment is not limited, but from a practical standpoint, it is usually in the range of 60-180 minutes.

A photocatalyst according to the present invention which contains a metal complex can be prepared, after a metal halide is incorporated into titanium oxide in the above-described manner and optionally the resulting photocatalyst is subjected to post treatment by contact with water and/or heat treatment, by subjecting the product to a chemical reaction to introduce a desired metal complex into titanium oxide. However, there are cases in which a photocatalyst containing a metal complex is formed merely by contact of titanium oxide with a metal halide with or without subsequent post treatment.

In particular, a photocatalyst according to the present invention which contains a metal complex like a heteropoly acid or an isopoly acid can be prepared by bringing titanium oxide and/or its precursor into contact with a metal halide as described above and subsequently with a heteropoly acid or an isopoly acid. The contact with a heteropoly acid or an isopoly acid may be performed after the above-described post treatment, i.e., treatment with water or heat treatment to remove any halides which are present on the surface of the photocatalyst prepared by contact with a metal halide.

The contact may be performed using a solution of a heteropoly acid or an isopoly acid by immersion, precipitation, or kneading. The solvent used for the solution is preferably a polar solvent such as water, acetone, an alcohol, THF, or pyridine. The contact treatment with a heteropoly or isopoly acid is preferably carried out with heating. Alternatively or additionally, heat treatment may be performed in a temperature range of 373-773 K after the solvent used for the contact treatment is removed by distillation. Such heat treatment is preferable since it allows the metal complex to be firmly fixed to the titanium oxide, thereby increasing the activity of the photocatalyst.

A photocatalyst according to the present invention in which a heteropoly acid and/or an isopoly acid is included as a metal complex has an ESR spectrum having the above-described first feature at a temperature of 5 K and preferably the third feature.

A photocatalyst according to the present invention may be supported on a carrier or adsorbent having no photocatalytic activities such as silica, alumina, activated carbon, and zeolite. It may be doped with a promoter like a noble metal such as platinum, ruthenium, or palladium with the object of improving the reaction efficiency or the like.

The photocatalyst may be in the form of particles, fibers, a coating film (including a thin film), and the like. The form may be selected depending on the purpose of application. Particles encompass from fine particles on the order of one nanometer to granulated particles on the order of several millimeters, and the size and shape of the particles are not limited. In the case of a coating film, it is commonly fixed on the surface of a substrate, and its thickness is not limited. When a photocatalyst is shaped into any desired form such as a coating film or fiber, the shaped form normally comprises a binder in addition to particles of a titanium oxide-based photocatalyst. The presence of a binder makes it possible to increase the thickness of a coating film or diameter of a fiber and improve the strength and workability of the coating film or fiber. In place of or in addition to a binder, a shaping additive may be used.

A titanium oxide-based photocatalyst according to the present invention can be used as a photocatalytic functional product by depositing it on the surface of a substrate for fixation. The form of fixation may be selected depending on the surface shape of the substrate and the purpose of application and is not limited to a specific form, but it is typically a coating film.

The material of the substrate is not limited, and it may be any of a metallic material such as a carbon steel, plated steel, chromated steel, enameled steel, stainless steel, aluminum, titanium, and various alloys; an inorganic material such as a ceramic, glass, porcelain, and quartz; and an organic material such as a plastic, resin, and activated carbon. A composite material in which two or more different materials are combined such as a coated steel sheet may also be employed. However, some substrates having an organic material on their surface or made entirely of an organic material may be deteriorated or degraded by the oxidizing ability of the photocatalyst. In such cases, the surface of the substrate on which a photocatalyst is fixed should previously be coated with a material which is not degraded by the photocatalyst.

The shape of the substrate is also not limited, and it may be any shape such as a sheet or plate, a panel, fibers (including woven and nonwoven fabric), a mesh, or a pipe. The substrate may be a fabricated object having a complicated shape desired for a final product, or it may be even an object which is already installed or in service. The surface of the subject may be either porous or non-porous.

The above-described photocatalytic functional product may be manufactured by either of the following two methods.

In a first method, a coating fluid comprising particles of a titanium oxide-based photocatalyst according to the present invention dispersed in a solvent is prepared and applied to a substrate. The coating fluid may consist essentially of a photocatalyst and a solvent, but preferably it further comprises a binder.

The coating fluid may be prepared by merely adequately mixing the titanium oxide-based photocatalyst with a solvent or a solvent and a binder. However, a titanium oxide-based photocatalyst prepared by the above-described method typically has a small average diameter of primary particles in the range of several nanometers to several hundreds nanometers, so it is in the form of an agglomerated powder of such primary particles, and the average diameter of the agglomerated powder is as large as several tens of micrometers, for example. Therefore, if the coating fluid is prepared by mere mixing of the components, most particles of the photocatalyst remain in an agglomerated state.

In a preferred embodiment of the present invention, particles of a titanium oxide-based photocatalyst are subjected to dispersion treatment in a solvent to form a dispersion of the photocatalyst in the solvent, from which the coating fluid is prepared. In this manner, it is made possible to form a thinner and more uniform photocatalytic coating which has significantly improved film properties and photocatalytic activity.

The photocatalyst in the dispersion preferably has an average particle diameter of 500 nm or smaller. If the average particle diameter of the photocatalyst is larger than 500 nm, powdering and peeling of a coating film tends to occur readily. In addition, the storage stability of the dispersion becomes worse, since precipitation of the particles tend to occur readily. The average particle diameter of the photocatalyst is more preferably 300 nm or smaller and most preferably 200 nm or smaller. Ideally, all the particles of the photocatalyst are s in the form of primary particles.

The solvent in which the photocatalyst particles are dispersed (namely, a dispersion medium) includes water such as distilled water, deionized water, and ultrapure water; alcohols such as methanol, ethanol, and 2-propanol; ketones such as methyl ethyl ketone; aromatic hydrocarbons such as benzene, toluene, and xylene; and the like. These solvents may optionally be used in combination.

The dispersion treatment is preferably carried out by mixing the photocatalyst with a solvent in such an amount that the solids content of the resulting dispersion is in the range of from a few mass % to 30 mass %. If the solids content is outside this range, the dispersibility of the photocatalyst may decrease. A dispersing agent or a deflocculant may be added, if necessary. Examples of a dispersing agent are of the carbonyl or sulfone type, and examples of a deflocculant are hydrochloric acid and sulfuric acid. A base or an acid may be added for pH adjustment.

The dispersion treatment is preferably performed such that the titanium oxide-based photocatalyst is sufficiently deagglomerated while its bulk structure and surface structure are maintained as much as possible. Although it is possible to use a paint shaker, which is commonly used in the preparation of a coating fluid, for the dispersion treatment, it is preferred that the dispersion treatment be performed by use of a means which is capable of more powerful dispersion such as a media mill, a rotary knife for shearing dispersion, thin film rotation, and ultrasonic dispersion. Two or more dispersing means may be utilized in combination.

If the resulting dispersion contains coarse particles, they are preferably removed by filtration or centrifugal separation. This is because peeling or powdering of a coating film tends to originate from coarse particles. A solvent may be added to the dispersion obtained by the dispersion treatment to adjust its solids content.

The dispersion can be directly used as a coating fluid and applied to a substrate. A photocatalyst in the form of fine particles having an average diameter of 500 nm or smaller can form a film even in the absence of a binder, leading to the formation of a coating film which consists essentially of particles of the photocatalyst. However, since such film is low in strength and adhesion, a binder solution may be applied to the film for impregnating openings between the photocatalyst particles with the binder solution.

A preferable coating fluid further comprises a binder in addition to a photocatalyst and a solvent. The solvent may be the same as described above, but it is selected such that the binder is dissolved or emulsified therein. By mixing a dispersion of a titanium oxide-based photocatalyst prepared as above with a binder, it is possible to prepare a coating fluid which has improved dispersibility of the photocatalyst and good storage stability and which is capable of forming a coating film having a high photocatalytic activity.

The amount of the binder is adjusted such that the content of the titanium oxide-based photocatalyst in the resulting coating film is in the range of 5-95 mass %. A coating film containing less than 5 mass % of the photocatalyst exhibits little photocatalytic activity. If the content of the photocatalyst is more than 95 mass %, the amount of the binder is so small that the film forming properties of the coating fluid are deteriorated leading to the formation of a film which tends to peel off readily. The content of the photocatalyst is preferably from 30 to 90 mass % and more preferably at least 50 mass % in order to obtain an adequate photocatalytic activity.

As the binder component, a sol of a metal oxide such as silica, alumina, titania, magnesia, and zirconia (which becomes a gel in a dry film); an organic silane compound; and an organic resin such as a silicone resin, a fluororesin, a urethane resin, and an acrylic resin can be used. If the oxidizing ability of the photocatalyst is high enough to decompose some binder components, it is desirable to use a binder which is difficult to decompose such as a metal oxide sol or a silicone resin. When a good formability or high strength is required for a photocatalytic functional product to be manufactured, the required properties can be guaranteed by adding an appropriate amount of an organic resin such as a fluororesin, an acrylic resin, or a urethane resin to the above-described binder component which is difficult to decompose.

A preferred binder component is a silicon compound such as silica (e.g., a silica sol), a hydrolysate/condensate of an organic silane compound, or a silicone resin. Silica may be a silica sol (silica colloid) formed by hydrolysis and condensation of a silicate (e.g., ethyl silicate). As an organic silane compound, one having film forming properties such as an alkoxysilane or a silane coupling agent may be used.

The coating fluid may contain additional components other than those described above. Examples of such additional components include a titanium oxide-based photocatalyst having no visible light activity (e.g., a conventional titanium oxide-based photocatalyst), and a carrier when the photocatalyst is in the form of particles supported on the carrier. A minor additive such as a coloring agent (preferably an inorganic pigment) may be included in the coating film.

The application of the coating fluid can be carried out by a method selected from various well-known methods depending on the properties of the coating fluid and the shape of a substrate to be coated. After application, the coating film is dried (and optionally cured) with heating, if necessary. The temperature for drying (curing) can be determined according to the composition of the coating fluid (type of the solvent and binder), the highest temperature to which the substrate is resistant, and the like.

A photocatalyst-containing coating film formed on a substrate preferably has a thickness of at least 0.5 µm. A coating film thinner than 0.5 µm gives a very low photocatalytic activity by irradiation with visible light due to a very low amount of the photocatalyst contained therein. The film thickness may be selected depending on the catalytic performance required for a product and the manufacturing costs acceptable for the products. In view of the stability of the catalytic performance and the catalytic activity, the film thickness is preferably at least 3 μm and more preferably at least 5 μm. There is no upper limit on the film thickness, but in view of the costs and saturation of the effects, the film thickness is preferably at most 30 μm and more preferably at most 25 μm.

In a second method of manufacturing a photocatalytic functional product, titanium oxide and/or its precursor is previously deposited on the surface of a substrate, which is then brought into contact with a reactive medium containing a metal halide of the formula $MX_n$ or $MOX_n$ (wherein M, X, and n are as indicated above) while the substrate is subjected to heat treatment.

In the second method, the deposition of titanium oxide and/or its precursor on the surface of a substrate can be performed by preparing a coating fluid containing titanium oxide and/or its precursor followed by application of the fluid and drying in the same manner as just mentioned. Since the titanium oxide and/or its precursor must be brought into contact with a reactive medium in the next step, it is preferable that a binder other than titania not be used in the coating fluid or, if it is present, that its amount be as small as possible.

A preferable method for deposition comprises preparing a solution-type coating fluid containing a partially hydrolyzed titanium compound (e.g., a partial hydrolysate of a titanium alkoxide) or a titania sol dissolved in a solvent and applying it to the surface of a substrate so as to form a coating film substantially consisting solely of a titanium oxide precursor on the substrate surface after drying.

Another preferable method is to use a coating fluid prepared from particles of titanium oxide (or its insoluble precursor) and a titania sol as a binder, resulting in the formation of a coating film consisting substantially of titanium oxide and its precursor on the surface of a substrate.

The method of depositing titanium oxide and/or its precursor on the surface of a substrate is not limited to the above-described coating methods, and well-known vapor phase film forming methods such as CVD and PVD may be utilized, although they entail complicated operations and increased costs.

After titanium oxide and/or its precursor is deposited on the surface of a substrate to form a film, the surface of the substrate (more accurately, the film of titanium oxide and/or its precursor formed thereon) is brought into contact with a reactive medium containing a metal halide. The contact with the reactive medium may be performed in the same manner as described earlier with respect to the preparation of a photocatalyst. As described there, the reactive medium may be either liquid or gaseous, and preferably it is gaseous, namely, a reactive gas. The contact with the reactive gas is preferably performed with heating, as described before, as long as the substrate can resist such heating.

The substrate having titanium oxide and/or its precursor deposited thereon may be subjected to heat treatment as pretreatment prior to contact with the reactive medium. In addition, the substrate after it has contacted the reactive medium may be subjected to post treatment by contact with water and/or by heat treatment in order to stabilize the photocatalyst formed on the surface of the substrate. Such post treatment is preferable from a practical standpoint.

When it is desired to include a metal complex in the photocatalyst deposited on the substrate, a desired ligand may be introduced by a chemical reaction as described for the preparation of a photocatalyst. When the metal complex is a heteropoly acid and/or an isopoly acid, after a substrate having a film of titanium oxide and/or its precursor formed thereon is treated by contact with a reactive medium and optionally to post treatment by contact with water and/or heat treatment, the substrate is then treated by contact with a heteropoly acid and/or an isopoly acid and then by heat treatment, if necessary.

As in the first method, a binder-free dispersion of titanium oxide fine particles can be applied to a substrate to deposit titanium oxide thereon, the deposited titanium oxide is then brought into contact with a reactive medium, and thereafter it may be impregnated with a binder, if necessary.

A titanium oxide-based photocatalyst and a photocatalytic functional product according to the present invention which have been described above develop their photocatalytic activities by irradiation with not only ultraviolet light but also with only visible light having a wavelength of 400 nm or longer and thus exhibit excellent effects on decomposition, removal or safening of various harmful or deposited substances.

In actual use, the photocatalyst may be used in an environment in which it can contact a substance or substances to be decomposed and it can be irradiated with visible light. The light source may be any which includes or emits visible light having a wavelength of 400 nm or longer. For example, sunbeams, fluorescent tubes, halogen lamps, black lights, xenon lamps, and mercury vapor lamps can be used.

Harmful substances include gases present in air such as $NO_x$, $SO_x$, flons (chlorofluorocarbons), ammonia, and hydrogen sulfide; organic compounds such as aldehydes, amines, mercaptans, alcohols, BTX, and phenols; organic halogen compounds such as trihalomethanes, trichloroethylene, and flons; various agricultural chemicals such as herbicides, fungicides, and insecticides; various biological oxygen-demanding substances such as proteins and amino acids; surfactants; inorganic compounds such as cyanogen compounds and sulfur compounds; various heavy metal ions; and underwater microorganisms including bacteria, actinomyces, fungi, and algae. Deposited substances indicate substances directly deposited on the surface of a photocatalyst or a photocatalytic functional product, and they include microorganisms such as *E. coli, staphylococci, Pseudomonas aeruginosa*, and molds; as well as fats and oils, tars from tobaccos, finger prints, streaky marks of rain, and dirt.

The following examples are given to illustrate the present invention. In the examples, the content of a metal halide in a photocatalyst is that in mass % as metal. All parts in the examples are by mass unless otherwise indicated.

EXAMPLE 1

Preparation of a Titanium Oxide-Based Photocatalyst 0.5 grams of a commercially available anatase titanium oxide powder having an ultraviolet photocatalytic activity (ST-01 manufactured by Ishihara Sangyo, partially amorphous) were put into a quartz tube (with a diameter of 33 mm), and the tube was purged by argon and then heated to 573 K. Subsequently, a reactive gas containing 1.4 vol % of titanium tetrachloride ($TiCl_4$) in hydrogen gas was passed through the quartz tube to cause the titanium oxide to contact the gas, and this contact treatment was continued for 20 minutes at 573 K. The flow rate of the reactive gas was 2.0 L/min. Then, after the atmosphere in the tube was replaced by argon, the tube was slowly cooled to room temperature, and the resulting titanium oxide-based photocatalyst according to the present invention was recovered from the tube.

The photocatalyst contained a titanium halide which was bonded to the surface of the titanium oxide by a dehydrochlorination reaction of titanium tetrachloride with the hydroxyl groups present on the surface of the titanium oxide. The amount of Ti metal introduced into the photocatalyst by the contact treatment was calculated based on the weight gain measured after the treatment and the halogen content of the photocatalyst.

The ESR spectra and photocatalytic activity (in an acetaldehyde decomposition test) of the photocatalyst were measured by the following methods. The absorption spectrum of the material was also measured, and it showed that the material was absorptive in the visible wavelength region of 400 nm or longer.

Measurement of ESR Spectrum

A sample sealed in a Teflon™ tube for ESR measurement in air was irradiated with visible light from a 200 W halogen lamp for at least 10 minutes at room temperature, and then the ESR spectrum of the sample was measured with continued irradiation. Thereafter, the sample in the tube was placed in the dark and the measurement of an ESR spectrum was performed without irradiation with visible light.

The measurement of an ESR spectrum was performed under the following conditions:

Measuring equipment: X-band (9 GHz band) electron spin resonance spectrometer manufactured by Japan Electron Optics Laboratory (JES-RE2X)

Detection limit of ESR signals: 1E 10/mT [=1E 10 spins (unpaired electrons) contributing to the same ESR signal in the sample]

Magnetic scanning range: 330±25 mT

Width of magnetic modulation: 0.1 mT

Magnetic modulation frequency: 100 KHz

Scanning time: 2 minutes

Number of scans: 1

Amplification factor: 500

Delay time: 0.1 seconds

Microwave output: 0.1 mW.

The g value was calculated as follows:

Based on the third signal (g=2.0303) and the fourth signal (g=1.981) of a $Mn^{2+}$/MgO marker (attached to the equipment), the g value of an ESR signal of the sample was calculated by the following equation:

$$g=2.0303-(2.0303-1.981) \times L3/(L3+L4)$$

wherein

L3: difference in magnetic field between the third peak of the marker and the ESR signal of the sample; and L4: difference in magnetic field between the fourth peak of the marker and the ESR signal of the sample.

With respect to the intensity of an ESR peak, since the detected ESR signals are differential signals, the difference between the maximum and minimum values of a differential signal was taken as the intensity of the ESR signal.

Figure 3:
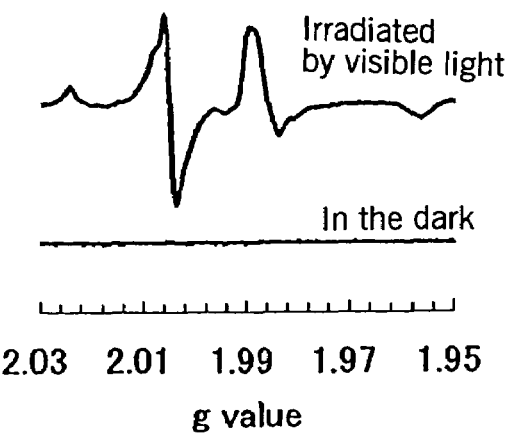
FIG. 3 shows an ESR spectrum measured at 5 K in air of a titanium oxide-based photocatalyst according to the present invention which was obtained in Example 1.

ESR spectra measured at 5 K are shown in FIG. 3. As can be seen from this figure, an ESR spectrum measured at 5 K with visible light irradiation had peaks in a g-value range of 1.950-2.030, and these peaks were not observed in an ESR spectrum measured in the dark (the above-described first feature). An additional peak in a g-value range of 1.986-1.994, which was different from the triplet signal attributable to oxygen defects and having g value ranges of 2.002-2.010, 2.020-2.028, and 1.982-1.998, appeared in the ESR spectrum (the above-described third feature).

Measurement of Photocatalytic Activity (Acetaldehyde Decomposition Test)

A sample (0.3 grams) was placed on a dish measuring 40 mm square, and the dish was put into a quartz reaction cell. The cell was connected to a closed circulating line system (having a total internal volume of about 3.0 liter), and a gas prepared by diluting acetaldehyde with a nitrogen gas containing 20 vol % of oxygen (to an acetaldehyde concentration of about 240 ppm) was introduced into the system. While the gas was circulated in the system, the reaction cell was irradiated with light from a 250 W high-pressure mercury-vapor lamp through an ultraviolet cutoff filter (Toshiba L42). Due to the performance of the filter, the irradiated light included a slight amount of near ultraviolet light having a wavelength in the region of 390 nm to 400 nm, but the most part (at least 99.9% in energy intensity) was visible light having a wavelength of 400 nm or longer. The reaction was monitored by periodically measuring the concentration of carbon dioxide, which was formed by decomposition of acetaldehyde, by an automated gas chromatograph connected to the circulating line. The photocatalytic activity was evaluated in terms of the rate of carbon dioxide formation. The result is shown in Table 1.

COMPARATIVE EXAMPLE 1

The same commercially available titanium oxide powder as was used in Example 1 as a raw material was used as a photocatalyst as is with no treatment and was subjected to an acetaldehyde decomposition test with visible light irradiation in the same manner as described in Example 1. The result is shown in Table 1. The titanium oxide, which was active with ultraviolet light, had an absorption spectrum having no absorption peaks in the visible wavelength region and thus did not absorb visible light.

EXAMPLE 2

(a) Titanium oxide was prepared according to the method described in Handbook of Catalytic Experiments (published by Kodansha Scientific, Tokyo). Namely, 200 cc of an ice-cooled aqueous solution of $TiCl_4$ (Ti content of 16.5%) was neutralized by adding an aqueous ammonia solution (28%) with stirring until an alkaline pH was obtained. The resulting precipitate was collected by filtration, then thoroughly washed with water, and then vacuum dried at 353 K to prepare a titanium oxide powder.

The crystal form of the crystalline portion of the titanium oxide powder thus obtained was anatase. The titanium oxide powder was treated by contact with a reactive gas containing 1.4 vol % of $TiCl_4$ in hydrogen in the same manner as described in Example 1 to prepare a titanium oxide-based photocatalyst according to the present invention.

(b) The titanium oxide-based photocatalyst obtained in (a) above was further subjected to post treatment by heat treatment at 573 K in an argon atmosphere for 20 minutes. This heat treatment in an argon atmosphere resulted in removal of a considerable part of the metal halide which had been introduced into the titanium oxide during the previous heat treatment with the reactive gas.

The titanium oxide-based photocatalysts obtained in (a) and (b) above were subjected to determination of the amount of Ti of the metal halide (metal compound) present therein and to an acetaldehyde decomposition test by the above-described methods. The results are also included in Table 1.

Both the products of (a) and (b) showed the above-described first and third features in their ESR spectra. In addition, the product of (b) showed the above-described second feature.

TABLE 1

| Number | Metal content[1] (mass %) | Rate of $CO_2$ formation (μmol/h) |
|---|---|---|
| Example 1 | 1.2 | 11.3 |
| Comparative Example 1 | 0 | <0.1 |
| Example 2(a) | 1.3 | 39.0 |
| Example 2(b) | 0.156 | 0.7 |

[1]Amount of Ti present as a titanium chloride

As can be seen from a comparison between Examples 1-2 and Comparative Example 1, it was confirmed that a titanium oxide-based photocatalyst which had been treated so as to include a metal halide (titanium tetrachloride) according to the present invention exhibited satisfactory photocatalytic activity by irradiation with visible light. In contrast, with a commercially available titanium oxide which had not been subjected to such treatment (Comparative Example 1), no substantial photocatalytic activity was observed by irradiation with visible light.

By comparison between Examples 2(a) and 2(b), it was found that the photocatalytic activity increased as the content of metal halides increased. The content of metal halides was not significantly different between the photocatalysts of Example 1 and Example 2(a), but the photocatalytic activity in Example 2(a) was significantly higher. This is thought to be because the conditions of a titanium oxide such as crystallinity and particle diameter have great influences on the structure and location in which the metal halides are present to render the titanium oxide to be capable of developing its photocatalytic activity with visible light.

The thermal desorption spectrum (TDS) of the titanium oxide-based photocatalysts obtained in Examples 2(a) ane 2(b) were measured in the following manner. The results are shown in FIGS. 1 and 2, respectively.

Measurement of Thermal Desorption Spectrum

The measurement of a thermal desorption spectrum was conducted using a high resolution thermal desorption spectrometer (EMD-WA1000S manufactured by Electronic Science Co., Tokyo). A sample was placed in a platinum cell and thoroughly evacuated to $10^{-6}$ Torr. Subsequently, while the temperature of the sample was raised at a rate of 1 K/sec, any gases desorbed from the sample were analyzed by a mass spectrograph.

Figure 2:
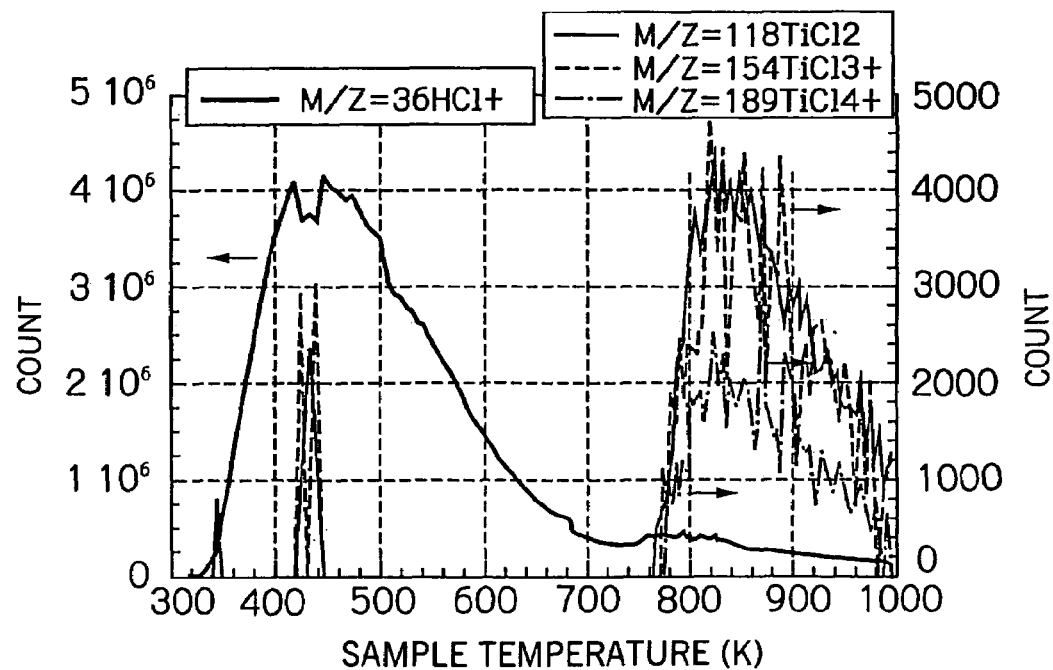
FIG. 2 shows a thermal desorption spectrum (TDS) of another titanium oxide-based photocatalyst according to the present invention which was prepared in Example 2(b).

As can be seen from FIGS. 1 and 2, in either the photocatalyst of Example 2(a) (FIG. 1) in which 1.3 mass % of metal halides were introduced in the titanium oxide by contact with a reactive gas and the photocatalyst of Example 2(b) (FIG. 2) in which the photocatalyst of Example 2(a) was further heat-treated in an argon atmosphere thereby reducing the content of metal halides to 0.156 mass %, molecular ions of halogen-containing substances or their fragment ions such as $TiCl_2$ (M/Z=118), $TiC_3$ (M/Z=154), $TiCl_4$ (M/Z=189), and HCl (M/Z=36) were detected. Among these, the peaks of the first three ions of titanium chlorides appeared in a temperature range above 623 K. Thus, either of these photocatalysts had a peak of a molecular ion or fragment ion of a halogen-containing substance at a temperature above 623 K in its thermal desorption spectrum.

EXAMPLE 3

Titanium oxide-based photocatalysts according to the present invention were prepared in the same manner as described in Example 1 except that the reactive gas containing 1.4 vol % of $TiCl_4$ in hydrogen gas was replaced by a reactive gas containing about 1 vol % of $VOCl_3$, $SnCl_4$, $SbCl_5$, $SiCl_4$, $WCl_6$, $BiCl_6$, $FeCl_3$, $ZnCl_4$ or $TiCl_4$ in argon gas. The results of an acetaldehyde decomposition test which was performed on these photocatalysts by the above-described method with visible light irradiation are shown in Table 2.

TABLE 2

| Run No. | Metal halide | Rate of $CO_2$ formation (μmol/h) |
|---|---|---|
| 1 | $VOCl_3$ | 0.4 |
| 2 | $SnCl_4$ | 1.1 |
| 3 | $SbCl_5$ | 0.3 |
| 4 | $SiCl_4$ | 0.7 |
| 5 | $WCl_6$ | 2.4 |
| 6 | $BiCl_3$ | 7.7 |
| 7 | $FeCl_3$ | 0.1 |
| 8 | $ZrCl_4$ | 0.1 |
| 9 | $TiCl_4$ | 11.3 |

It is apparent that all the metal halides were able to provide a titanium oxide-based photocatalyst having a visible light photocatalytic activity. Among these halides, $TiCl_4$, $BiCl_6$, and $WCl_6$ were able to impart a higher photocatalytic activity.

EXAMPLE 4

Titanium oxide-based photocatalysts according to the present invention were prepared in the same manner as described in Example 1 except that the conditions (temperature and duration) for contact with the reactive gas containing 1.4 vol % of $TiCl_4$ in hydrogen gas were varied as shown in Table 3. An acetaldehyde decomposition test was performed on these photocatalysts by the above-described method with visible light irradiation. The test results are shown in Table 3 along with the conditions for the heat treatment.

TABLE 3

| Run No. | Conditions of contact (temp. × duration) | Rate of $CO_2$ formation (μmol/h) |
|---|---|---|
| 1 | 323 K × 20 minutes | 0.1 |
| 2 | 373 K × 20 minutes | 0.4 |
| 3 | 373 K × 120 minutes | 0.5 |
| 4 | 423 K × 20 minutes | 0.6 |
| 5 | 473 K × 20 minutes | 3.5 |
| 6 | 523 K × 20 minutes | 8.8 |
| 7 | 573 K × 20 minutes | 11.3 |
| 8 | 623 K × 20 minutes | 4.8 |
| 9 | 673 K × 20 minutes | 2.5 |
| 10 | 773 K × 5 minutes | 4.2 |
| 11 | 773 K × 20 minutes | 0.1 |
| 12 | 873 K × 20 minutes | 0.1 |

A titanium oxide-based photocatalyst having a visible light photocatalytic activity could be obtained by performing the treatment with a reactive gas at a temperature of 323 K or higher. The temperature for the treatment at which a high photocatalytic activity was obtained was in the range of 373-773 K, and in particular, better results are achieved in the range of 473-773 K. A photocatalyst having a high activity could be obtained by a longer duration of treatment when the temperature was lower or by a shorter duration of a treatment when the temperature was higher.

EXAMPLE 5

A titanium oxide powder used as a raw material was prepared by neutralizing an aqueous solution of $TiCl_4$ with an aqueous ammonia solution in the same manner as described in Example 2 except that the concentration of the aqueous TiCl$_4$ solution was half that in Example 2, i.e., 8.25% as Ti.

1.0 gram of the titanium oxide powder was treated by contact with a reactive gas containing 1.4 vol % of TiCl$_4$ in hydrogen in the same manner as described in Example 1. Subsequently, the resulting treated product was subjected to post treatment by contact with water three times wherein each time 1.0 gram of the product was stirred in 10 grams of water and then collected by filtration. Thereafter, the treated product was dried for at least 24 hours at 323 K to prepare a titanium oxide-based photocatalyst according to the present invention.

The results of X-ray diffractometric analysis showed that the titanium oxide-based photocatalyst which had an orange color had crystal forms which were predominantly anatase, but the coexistence of brookite in an extremely small amount was also observed.

Figure 4:
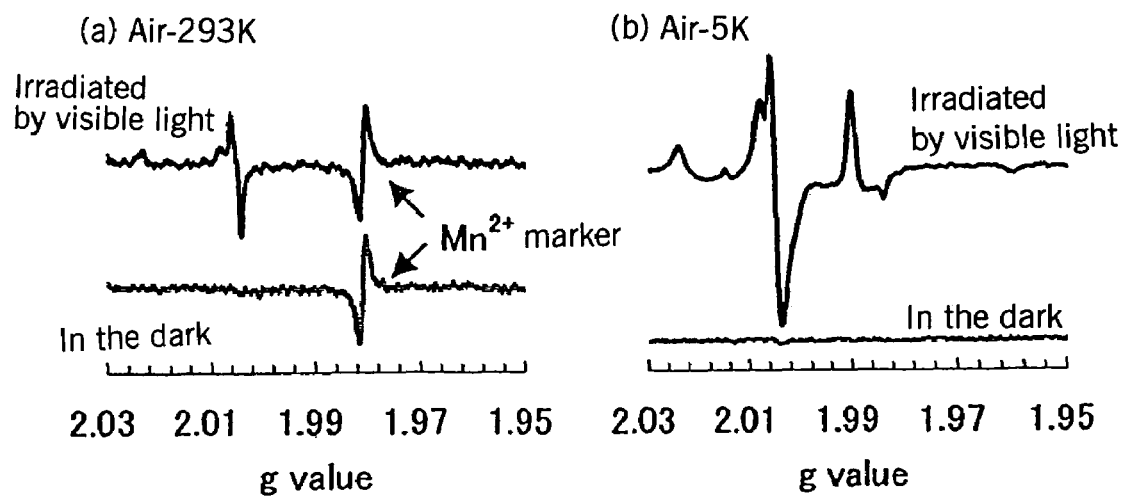
FIG. 4 shows an ESR spectrum measured at 293 K and 5 K in air of a titanium oxide-based photocatalyst according to the present invention which was obtained in Example 5.

Measurements of ESR spectra in air (at 5 K and 293 K) and the visible light photocatalytic activity (by an acetaldehyde decomposition test) were performed on the photocatalyst according to the present invention in the same manner as described in Example 1. The results are shown in FIG. 4 and Table 4. The photocatalyst had visible light absorptivity.

Figure 6:
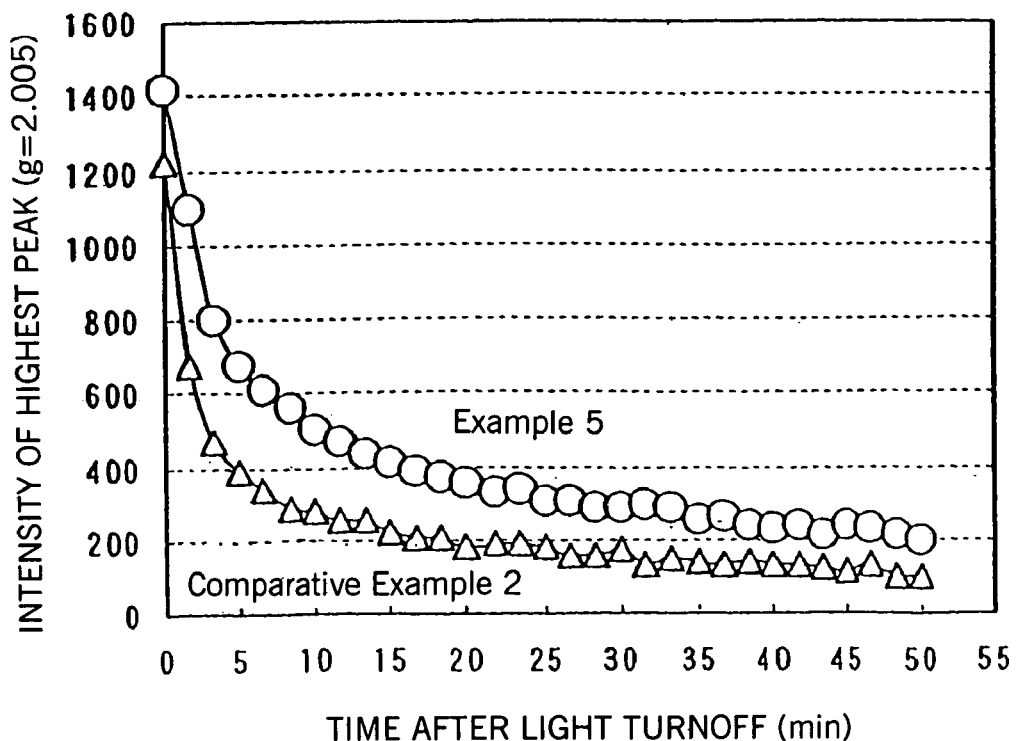
FIG. 6 is a graph showing the decrease, after turnoff of the light, in the intensity of the highest peak observed in a g-value range of 1.950-2.030 in ESR spectra of the titanium oxide-based photocatalysts of Example 5 and Comparative Example 2 which were measured in a deoxidized atmosphere.

In this example, an ESR spectrum in a deoxidized atmosphere was also measured in the following manner. A sample was put into a quartz tube for ESR measurement and vacuum sealed (about $10^{31}$ Torr) using a rotary vacuum pump. At a predetermined temperature in the range of from 5 K to 293 K (room temperature) set by a cryostat, the sample was irradiated with visible light for at least 10 minutes before its ESR spectrum was measured while continuing the irradiation. When the half life of a peak intensity was subsequently determined, after the irradiation with visible light was stopped, measurements of ESR spectra were performed at predetermined intervals to follow the decrease of the peak intensity. The results are shown in FIG. 6.

COMPARATIVE EXAMPLE 2

Figure 5:
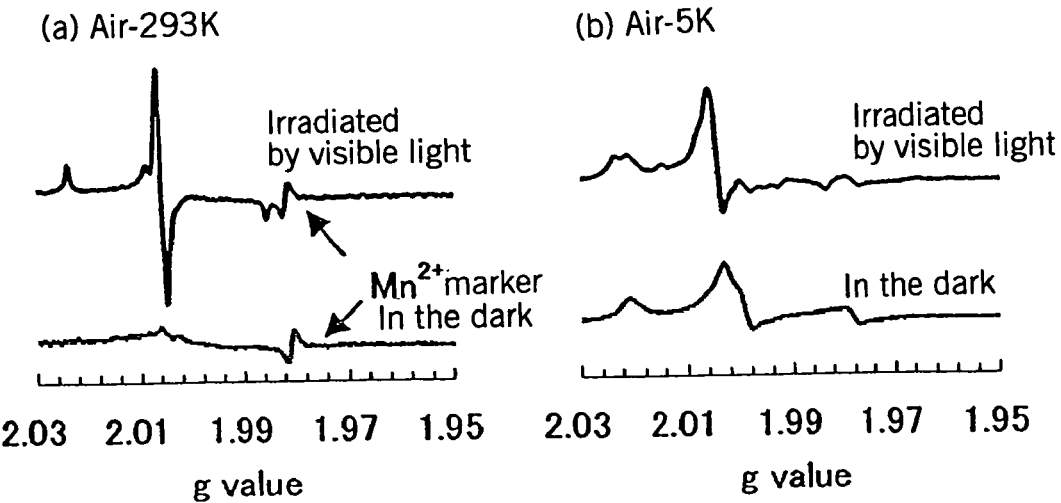
FIG. 5 shows an ESR spectrum measured at 293 K and 5 K in air of a known titanium oxide-based photocatalyst having visible light activity (used in Comparative Example 2).

A known titanium oxide-based photocatalyst in powder form having visible light activity was used to perform measurements of ESR spectra in air and in a deoxidized atmosphere and an acetaldehyde decomposition test with visible light irradiation in the same manner as described in Example 5. The results are shown in FIGS. 5 and 6 and Table 4. The photocatalyst had a color and had visible light absorptivity.

TABLE 4

| Items measured | | Example 5 | Comparative Example 2 |
|---|---|---|---|
| ESR (293 K, 5K): presence of a peak in a g-value range of 1.950-2.030 | Irradiated with visible light | Yes | Yes |
| | In the dark | No | Yes |
| Half life in a vacuum of the highest peak in the above g value range | | 4.8 min. | 1.7 min. |
| ESR (5 K): presence of a peak in a g-value range of 1.986-1.994 | | Yes | No |
| Rate of CO$_2$ formation (μmole/h) | | 3.5 | 2.5 |

As shown in Table 4, the titanium oxide-based photocatalyst according to the present invention exhibited a higher activity than a known photocatalyst which was active with visible light even after stabilized by post treatment which was performed by contact with water. Thus, it was found that the photocatalyst still maintained its visible light photocatalytic activity at a level sufficient for practical use after the photocatalytic activity was decreased by the post treatment.

As shown in FIG. 4, in the ESR spectra of the photocatalyst according to the present invention, a triplet signal attributed to unpaired electrons captured by oxygen defects was observed in a g-value range of 1.950-2.030 (in which the peak appearing in the lowest magnetic field overlapped a peak of the manganese marker). This indicates that the titanium oxide was of the visible light absorbing type having oxygen defects.

In addition, at each temperature of 293 K (room temperature) and 5 K, the peaks in a g-value range of 1.950-2.030 which were observed by measurement with irradiation by visible light were not observed by measurement in the dark (the above-described first feature). In contrast, in Comparative Example 2, these peaks observed with visible light irradiation were also observed in the dark, and extremely large peaks were observed by measurement at 5 K in the dark (FIG. 5).

From the result of measurement at 5 K shown in FIG. 4, with the photocatalyst according to the present invention, a new peak, which was not observed by measurement at room temperature, appeared in a g-value range of 1.986-1.994 (around 1.99)(the above-described third feature). In contrast, with a photocatalyst of Comparative Example 2 shown in FIG. 5, such peak was not observed in the results measured at 5 K.

From the result of variation in the intensity of the highest peak (g=2.005) measured in a deoxidized atmosphere, i.e., variation in the concentration of the catalytically active species, after extinction shown in FIG. 6, the decrease occurred slowly with the photocatalyst according to the present invention, and the half life of the peak intensity was 4.8 minutes (the above-described second feature). In contrast, with the comparative example, the decrease occurred rapidly, and the half life was 1.7 minutes.

From these results of ESR spectra, it is suggested that there was a big difference in the structure as an oxide between the photocatalyst according to the present invention and that in the comparative example. A titanium oxide-based photocatalyst having improved visible light photocatalytic activity can be obtained when its ESR spectra have at least one of the features defined in the present invention.

EXAMPLE 6

A titanium oxide-based photocatalyst according to the present invention was prepared following the method described in Example 5 except that the same commercially available titanium oxide powder as used in Example 1 (ST-01) was used as a raw material in place of the prepared powder of titanium oxide used in Example 5.

The resulting photocatalyst was subjected to an acetaldehyde decomposition test in the same manner as described in Example 1. As a result, the rate of CO$_2$ formation was 1.2 μmol/h.

As indicated in Comparative Example 1, the raw material powder of titanium oxide had no photocatalytic activity since its rate of CO$_2$ formation was less than 0.1 μmol/h. From such a commercially available titanium oxide, a titanium oxide-based photocatalyst of the present invention which has visible light photocatalytic activity and is easy to handle can be prepared by a method disclosed herein.

EXAMPLE 7

Titanium oxide-based photocatalysts according to the present invention were prepared in the same manner as described in Example 5 except that the conditions for preparation were varied as shown in Table 5.

Example 5 corresponds to Run No. 7 of Table 5. The heat treatment for pretreatment and any post treatment were carried out in air unless otherwise indicated. In Runs Nos. 14 and 15, post treatment was conducted by heat treatment under the conditions shown in the table, in place of contact with water. In Run No. 16, contact with a reactive gas was performed using a nitrogen gas containing titanium tetrachloride (1.4 vol %). In Run No. 29, pretreatment was conducted in an ammonia (2 vol %)-argon atmosphere. In Run No. 30, pretreatment was performed by wet hydrothermal treatment in a Teflon™-lined autoclave using water containing ammonium chloride (1 M) and hydrochloric acid (1 M) (under the conditions shown in the table).

Using the resulting photocatalysts, an acetaldehyde decomposition test was performed by the above-described method with visible light irradiation. The test results are shown in Table 5 along with the conditions for preparation.

COMPARATIVE EXAMPLE 3

The titanium oxide powder prepared in Example 5 as a raw material was calcined for 1 hour at 573 K in air to obtain a photocatalyst. This sample was also subjected to an acetaldehyde decomposition test by the above-described method with visible light irradiation. The test result is shown in Table 5 (as Run No. 31) along with the conditions for preparation.

Titanium oxide-based photocatalysts according to the present invention which exhibited visible light photocatalytic activity could be obtained by subjecting titanium oxide to contact with a reactive gas containing a metal halide (titanium tetrachloride in this example) followed by post treatment. The temperature range for that contact in which a photocatalyst having an increased photocatalytic activity was obtained was 373-676 K. In particular, better results were achieved in the range of 523-673 K.

Even when a satisfactory activity was not obtained because of a low temperature at which the contact of a raw material with a reactive gas was conducted, the activity could be increased by subsequently performing heat treatment as post treatment. With respect to the duration of contact with a reactive gas, it was found that a longer duration was desirable for contact at a lower temperature while a shorter duration was desirable for contact at a higher temperature. In the case of contact at 573 K, a highly active photocatalyst was obtained when the duration was approximately between 10 and 40 minutes. A photocatalyst having visible light activity could also be prepared by replacing hydrogen, which was used as the base gas for a reactive gas, by nitrogen.

With respect to the heat treatment prior to contact with the reactive gas (as pretreatment), it was found that a photocatalyst having an increased activity was obtained if the heat

TABLE 5

| Run No. | Pretreatment (Temp. × Duration) | Contact with reactive gas (Temp. × Duration) | Post treatment (K × Minutes) | Rate of $CO_2$ formation (μmol/h) |
|---|---|---|---|---|
| 1 | (None) | 323 K × 20 min. | (Contact with water) | 1.2 |
| 2 | (None) | 373 K × 20 min. | (Contact with water) | 1.7 |
| 3 | (None) | 423 K × 20 min. | (Contact with water) | 1.8 |
| 4 | (None) | 423 K × 120 min. | (Contact with water) | 2.8 |
| 5 | (None) | 473 K × 20 min. | (Contact with water) | 1.8 |
| 6 | (None) | 523 K × 20 min. | (Contact with water) | 2.2 |
| 7 | (None) | 573 K × 20 min. | (Contact with water) | 3.5 |
| 8 | (None) | 598 K × 20 min. | (Contact with water) | 3.9 |
| 9 | (None) | 623 K × 20 min. | (Contact with water) | 3.1 |
| 10 | (None) | 673 K × 20 min. | (Contact with water) | 2.4 |
| 11 | (None) | 673 K × 6 min. | (Contact with water) | 3.0 |
| 12 | (None) | 723 K × 20 min. | (Contact with water) | 0.8 |
| 13 | (None) | 773 K × 20 min. | (Contact with water) | 0.3 |
| 14 | (None) | 373 K × 20 min. | 573 × 60 | 3 |
| 15 | (None) | 573 K × 20 min. | 573 × 60 | 3.2 |
| 16 | (None) | 573 K × 20 min. ($N_2$) | (Contact with water) | 2.6 |
| 17 | 373 K × 60 min. | 573 K × 20 min. | (Contact with water) | 3.5 |
| 18 | 473 K × 60 min. | 573 K × 20 min. | (Contact with water) | 3.8 |
| 19 | 573 K × 60 min. | 573 K × 20 min. | (Contact with water) | 3.3 |
| 20 | 623 K × 60 min. | 573 K × 20 min. | (Contact with water) | 2.7 |
| 21 | 673 K × 60 min. | 573 K × 20 min. | (Contact with water) | 2.3 |
| 22 | 773 K × 60 min. | 573 K × 20 min. | (Contact with water) | 2.2 |
| 23 | 473 K × 60 min. | 573 K × 10 min. | (Contact with water) | 3.5 |
| 24 | 473 K × 60 min. | 573 K × 20 min. | (Contact with water) | 3.8 |
| 25 | 473 K × 60 min. | 573 K × 30 min. | (Contact with water) | 3.5 |
| 26 | 473 K × 60 min. | 573 K × 40 min. | (Contact with water) | 3.9 |
| 27 | 473 K × 60 min. | 573 K × 60 min. | (Contact with water) | 1.8 |
| 28 | 473 K × 60 min. | 573 K × 120 min. | (Contact with water) | 1.2 |
| 29 | 473 K × 60 min. ($NH_3$—Ar) | 573 K × 20 min. | (Contact with water) | 4.1 |
| 30 | 473 K × 360 min. ($NH_4Cl$—HCl) | 573 K × 20 min. | (Contact with water) | 4.3 |
| 31[1] | (None) | 573 K × 60 min. (calcination in air) | (None) | 1 |
| 32[2] | (None) | 573 K × 20 min. | (None) | 39.0 |

[1] Run No. 31 is a comparative example in which the same raw material was merely calcined in air.
[2] Run No. 32 is the same as Example 2(a).

treatment was performed in the temperature range of 373-573 K. In addition, it was confirmed that pretreatment performed in an ammonia-containing atmosphere which is a reducing atmosphere or by a wet process in a solution was also effective.

In contrast, the photocatalyst of Run No. 31 (Comparative Example 3) which was prepared by mere calcination in air without treatment by contact with a reactive gas containing titanium tetrachloride had a significantly decreased visible light photocatalytic activity compared to the photocatalyst of Run No. 32 (Example 2(a)).

EXAMPLE 8

In exactly the same manner as in Example 5, a prepared raw material of titanium oxide was treated by contact with a $TiCl_4$-containing gas and then post treatment by contact with water to give a titanium oxide-based photocatalyst having visible light photocatalytic activity after drying.

The resulting titanium oxide powder was then impregnated with an aqueous solution prepared by dissolving $H_3PW_{12}O_{40}$ or $H_3SiW_{12}O_{40}$ in distilled water (to about 50% concentration). After 4 hours, the solution was removed by filtration, and the recovered titanium oxide powder was dried overnight at 50° C. Subsequently, the powder was heat-treated for 2 hours at 773 K for fixation of the impregnated compound to prepare two titanium oxide-based photocatalysts containing a heteropoly acid on the surface.

The content of the metal complex in these photocatalysts expressed as metal content relative to the weight of titanium oxide was 77 mass % for the catalyst containing $H_3PW_{12}O_{40}$ and 63 mass % for the catalyst containing $H_3SiW_{12}O_{40}$.

These photocatalysts were subjected to an acetaldehyde decomposition test by the above-described method with visible light irradiation. The photocatalytic activity expressed in terms of the rate of $CO_2$ formation was 7.7 μmol/h for the $H_3PW_{12}O_{40}$-containing catalyst and 7.0 μmol/h for the $H_3SiW_{12}O_{40}$-containing catalyst. Compared to the catalyst as subjected to the post treatment, it was found that the photocatalytic activity was significantly increased by introducing a metal complex into the photocatalyst. Thus, the introduction of a metal complex makes it possible to significantly increase the photocatalytic activity while maintaining the stability achieved by the post treatment.

EXAMPLE 9

This example illustrates the manufacture of photocatalytic functional products according to the present invention.

(a) A titanium oxide film having a thickness of about 100 nm was formed on a glass cloth by CVD using $TiCl_4$ as a film-forming material.

The glass cloth having a titanium oxide film on the surface was treated by contact with a reactive gas containing 1.4 vol % of $TiCl_4$ in hydrogen gas to thus cause the titanium oxide film to contain a titanium chloride therein. The treatment was carried out in the same manner as described in Example 1 except that the above-described glass cloth was used in place of the titanium oxide powder. In this manner, a photocatalytic functional product having a film of a titanium oxide-based photocatalyst according to the present invention on the surface of a glass cloth was obtained.

A sample of the photocatalytic functional product was subjected to an acetaldehyde decomposition test with visible light irradiation in the same manner as described in Example 1. The size of the sample was 16 cm². The rate of $CO_2$ formation achieved in the test was 0.35 μmol/h.

(b) A photocatalytic coating fluid was prepared by adding 3 parts of the titanium oxide-based photocatalyst powder according to the present invention prepared in Example 1, 1 part of the titanium oxide powder used in Example 1 as a raw material (ST-01) which was a conventional photocatalyst, and 2 parts (as $SiO_2$) of a silica colloid (Snowtex O manufactured by Nissan Chemical Industries, 20 mass % $SiO_2$) as a binder to 36 parts of a mixed solvent of alcohol and water and thoroughly mixing them using a paint shaker (manufactured by Red Devil).

The coating fluid was applied by a bar coater onto the surface of a precoated steel sheet, the surface having a previously formed primer coating (thickness: about 1 μm) based on a silicone resin. The applied coating was dried by heating for 3 minutes at 423 K to prepare a photocatalytic functional product having a coating film containing a titanium oxide-based photocatalyst according to the present invention on the surface of the precoated steel sheet as a substrate. The thickness of the coating film (photocatalytic layer) was about 1 μm. A sample of the photocatalytic functional product was subjected to an acetaldehyde decomposition test with visible light irradiation as in (a) above. The rate of $CO_2$ formation was 0.25 μmol/h.

COMPARATIVE EXAMPLE 4

(a) The glass cloth prepared in Example 9(a) which had a titanium oxide film on the surface was used as a test material as is (without treatment by contact with a reactive gas) and subjected to an acetaldehyde decomposition test with visible light irradiation in the same manner as in Example 9. The rate of $CO_2$ formation was 0.0 μmol/h.

(b) A coating fluid was prepared in the same manner as described in Example 9(b) except that the titanium oxide-based photocatalyst powder according to the present invention was replaced by 3 parts of the conventional photocatalytic titanium oxide powder (ST-01) (the total amount of this powder which was used being 4 parts). The coating fluid was used to form a coating film on the surface of a precoated steel sheet in the same manner as in Example 9(b). The resulting comparative photocatalytic functional product was subjected to an acetaldehyde decomposition test with visible light irradiation. The rate of $CO_2$ formation was 0.0 μmol/h.

EXAMPLE 10

This example further illustrates the manufacture of photocatalytic functional products according to the present invention.

(a) A titanium oxide colloid sol was prepared by adding 3 parts of hydrazine to 1 part of an aqueous $TiCl_4$ (16.5 mass %) solution. After the sol was subjected to deionization using a dialysis tube, an appropriate amount of ethanol was added, and the sol was applied onto a quartz substrate and dried at 373 K to form a titanium oxide coating film on the quartz substrate.

The titanium oxide film was treated by contact with a reactive gas which contained 1.4 vol % of $TiCl_4$ in hydrogen. The treatment was carried out in the same manner as described in Example 1 except that the above-described quartz substrate having a titanium oxide film formed thereon was used in place of the titanium oxide powder. Subsequently, the quartz substrate was heat-treated for 1 hour at 673 K in air for post treatment to obtain a photocatalytic functional product according to the present invention having a film of a titanium oxide-based photocatalyst. The film had a thickness of about 0.6 μm. The photocatalytic functional product was subjected to an acetaldehyde decomposition test with visible light irradiation in the same manner as in Example 9. The rate of $CO_2$ formation was 1.1 μmol/h.

(b) A photocatalytic coating fluid was prepared by adding 3 parts of the titanium oxide-based photocatalyst powder according to the present invention prepared in Example 5, 1.5 parts of a conventional photocatalytic titanium oxide powder (ST-01), and 1.5 parts (as $SiO_2$) of a silica colloid (which was the same as used in Example 9(b)) as a binder to 20 parts of a mixed solvent of alcohol and water and thoroughly mixing them using a paint shaker.

The coating fluid was applied and dried in the same manner as described in Example 9(b) to prepare a photocatalytic functional product having a coating film containing about 50 mass % of a titanium oxide-based photocatalyst according to the present invention on the surface of a precoated steel sheet as a substrate. The thickness of the coating film was about 0.8 μm. When the photocatalytic functional product was subjected to an acetaldehyde decomposition test with visible light irradiation by the above-described method, the rate of $CO_2$ formation was 0.45 μmol/h.

COMPARATIVE EXAMPLE 5

(a) The quartz substrate having a titanium oxide film prepared in Example 10(a) was directly heat treated for 1 hour at 673 K in air, without previous treatment by contact with a reactive gas, to prepare a test material. The test material was subjected to an acetaldehyde decomposition test with visible light irradiation in the same manner as in Example 9. The rate of $CO_2$ formation was 0.19 μmol/h.

(b) A coating fluid was prepared in the same manner as described in Example 10(b) except that the titanium oxide-based photocatalyst powder according to the present invention was replaced by 3 parts of the conventional photocatalytic titanium oxide powder (ST-01)(the total amount of this powder which was used being 4.5 parts). The coating fluid was used to form a coating film containing a photocatalyst consisting of titanium oxide on the surface of a precoated steel sheet in the same manner as in Example 10(b). The resulting comparative photocatalytic functional product was subjected to an acetaldehyde decomposition test with visible light irradiation in the same manner as in Example 9. The rate of $CO_2$ formation was 0.0 μmol/h.

EXAMPLE 11

A photocatalyst dispersion with solids content of 10 mass % was prepared by mixing 30 parts of a titanium oxide-based photocatalyst according to the present invention prepared in Example 5 with 270 parts of distilled water and subjecting the mixture to dispersion with zirconia beads (having a diameter of 0.4 mm) for 60 minutes using a media mill.

The average particle diameter of the resulting dispersion, which was measured by a particle size distribution analyzer LA-700 manufacture by Horiba, was about 310 nm. The average particle diameter of the photocatalyst before the dispersion treatment was about 34 μm.

A coating fluid was prepared by adding to 100 parts of the photocatalyst dispersion 50 parts of a silica colloid (Snowtex O manufactured by Nissan Chemical Industries, 20 mass % $SiO_2$), 4 parts of methyltriethoxysilane, and 150 parts of methanol and then shaking the mixture well for 60 minutes using a paint shaker.

The coating fluid was applied and dried in the same manner as described in Example 9(b) except that drying was performed for 10 minutes, and thus a photocatalytic functional product having a coating film containing a titanium oxide-based photocatalyst on the surface of a precoated steel sheet as a substrate was obtained. The coating film had a thickness of about 0.8 μm and contained about 42 mass % of the photocatalyst.

The photocatalytic functional product was subjected to an acetaldehyde decomposition test with visible light irradiation in the same manner as in Example 9. The rate of $CO_2$ formation was 0.72 μmol/h. As can be seen from comparison with Example 10(b), the photocatalytic activity was improved by preparing a coating fluid after the photocatalytic particles had been subjected to dispersion.

EXAMPLE 12

Preparation of Coating Fluids

After from 0.05 parts to 1 part of the titanium oxide-based photocatalyst powder prepared in Example 5 were subjected to dispersion, the resulting dispersion was added to a mixed solvent of ethanol and water (10 parts of ethanol and 30 parts of water) along with 1 part (as $SiO_2$) of a silica colloid (Snowtex OXS manufactured by Nissan Chemical Industries, 10 mass % $SiO_2$, particle diameter: 4-6 nm) used as a binder and thoroughly mixed using a paint shaker to prepare coating fluids.

In addition, in order to form a coating film which did not contain the silica binder, a coating fluid was prepared by adding only 1 part of the same titanium oxide-based photocatalyst as above to the mixed solvent followed by mixing in the same manner.

Formation of Photocatalytic Coating Films

These coating fluids were used for coating by dipping therein a 100 mm-square quartz plate having a thickness of 0.5 mm at room temperature, and the coating was dried for 10 minutes at 150° C. A photocatalytic functional product was obtained by repeating the dipping and drying as required until a photocatalytic coating film having a thickness of 1.0±0.1 μm was formed on the quartz plate.

Figure 7:
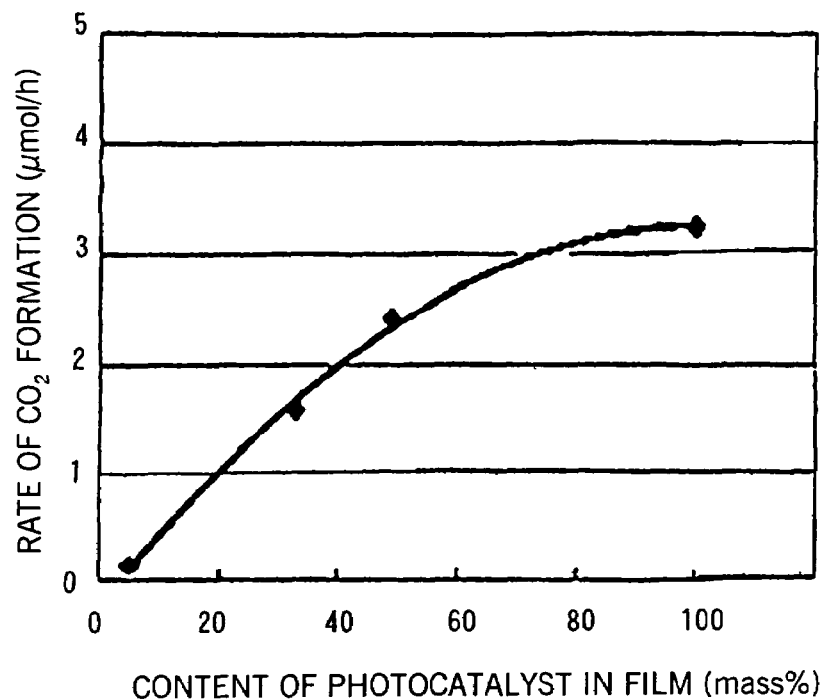
FIG. 7 is a graph showing the relationship between the content of a titanium oxide-based photocatalyst in a photocatalytic film and the visible light photocatalytic activity (rate of $CO_2$ formation) in an example.

Measurement of Photocatalytic Activity (Acetaldehyde Decomposition Test) The measurement of photocatalytic activity was performed in the same manner as described in Example 1 except that a 40 mm-square test piece which was cut from the quartz plate having a photocatalytic coating film (photocatalytic functional product) to be tested was put in the quartz reaction cell and that the total internal volume of the closed circulating line system was 1.0 liter. The results are shown in Table 6 and FIG. 7.

TABLE 6

| | Film thickness = 1.0 ± 0.1 μm | | |
|---|---|---|---|
| Run No. | Parts by mass of photocatalyst in coating fluid | Content of Photocatalyst in coating film (mass %) | Rate of $CO_2$ formation (μmol/h) |
| 1 | 0.05 | 5 | 0.12 |
| 2 | 0.5 | 34 | 1.58 |
| 3 | 1 | 50 | 2.42 |
| 4 | 100 | 100 | 3.22 |

(Note)
Photocatalyst = titanium oxide-based photocatalyst having visible light activity A photocatalytic coating film in which the content of a titanium oxide-based photocatalyst was at least 5 mass % exhibited photocatalytic activity by irradiation with visible light. Compared to the photocatalytic activity of the coating film with 100 mass % of the photocatalyst (100 mass % film), the photocatalytic activity of a film containing 30 mass % of the photocatalyst reached about 50% the activity of the 100 mass % film, and that of a film containing about 50 mass % of the photocatalyst reached about 75% the activity of the 100 mass % film. The increment in visible light photocatalytic activity achieved by an increased content of the photocatalyst approached almost zero when the content was about 90 mass %. Therefore, a preferable content of the photocatalyst in the coating film was 30-90 mass % and more preferably 50-90 mass %.

The coating film with 100 mass % of the titanium oxide-based photocatalyst had the highest visible light photocatalytic activity, but due to the absence of a binder, it had a very weak bonding of the photocatalytic powder and was readily peeled off from the quartz plate by rubbing with a finger, for example.

EXAMPLE 13

The formation of a photocatalytic coating film having a thickness of about 1 μm and the measurement of visible light photocatalytic activity were carried out in the same manner as described in Example 12 using 1 part of the titanium oxide-based photocatalyst powder prepared in Example 8 which contained a metal complex and 1 part of colloidal silica (the same as used in Example 1) as a binder component.

The content of the titanium oxide-based photocatalyst in the photocatalytic film was 50 mass %. Compared to the photocatalytic film of Example 12 having the same content, the rate of $CO_2$ formation achieved by measurement of visible light photocatalytic activity increased by a factor of about 2.

EXAMPLE 14

Figure 8:
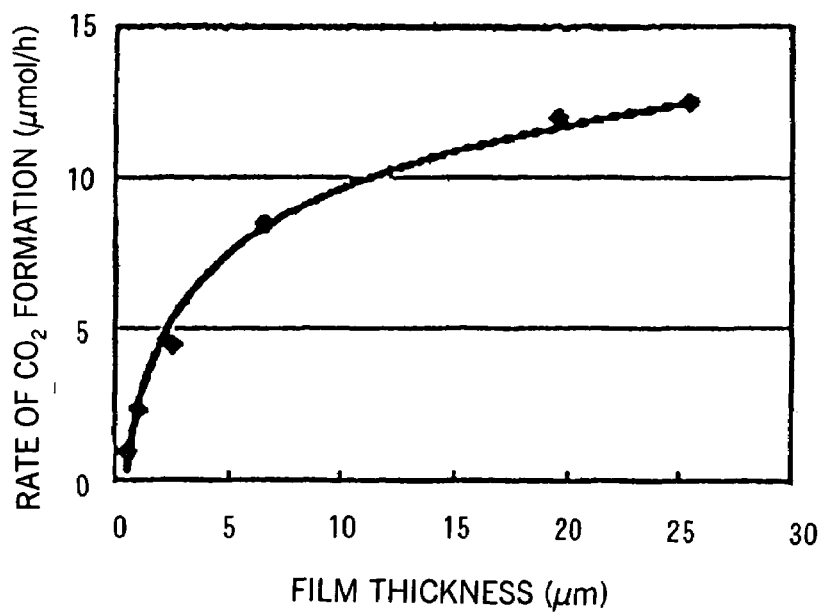
FIG. 8 is a graph showing the relationship between the thickness of a photocatalytic film and the visible light photocatalytic activity (rate of $CO_2$ formation) in an example.

The procedure of Example 12 was repeated with the amount of the titanium oxide-based photocatalyst in a coating fluid being fixed at 1 part while the number of repetitions of dipping of the quartz plate in the coating fluid and subsequent drying was varied to prepare photocatalytic functional products having a photocatalytic coating film formed on the quartz plate in which the thickness of the film varied in the range of 0.5-25.5 μm. The content of the titanium oxide-based photocatalyst having visible light activity in the coating film was constant and 50 mass % in all the runs. The results of measurement of visible light photocatalytic activity performed on these photocatalytic functional products in the same manner as described in Example 12 are shown in Table 7 and FIG. 8.

TABLE 7

| Run No. | Parts by mass of photocatalyst in coating fluid | % photocatalyst in coating film | Film thickness (μm) | Rate of $CO_2$ formation (μmol/h) |
|---|---|---|---|---|
| 1 | 1 | 50 | 0.5 | 1 |
| 2 | 1 | 50 | 1 | 2.4 |
| 3 | 1 | 50 | 2.5 | 4.5 |
| 4 | 1 | 50 | 6.6 | 8.4 |
| 5 | 1 | 50 | 19.6 | 12 |
| 6 | 1 | 50 | 25.5 | 12.5 |

(Note)
Photocatalyst = titanium oxide-based photocatalyst having visible light activity A photocatalytic coating film having a thickness of 0.5 μm or greater exhibited photocatalytic activity by irradiation with visible light. Compared to the photocatalytic activity of the coating film having a thickness of 25.5 μm, the photocatalytic activity of a film having a thickness of at least 3 μm reached at least 50% and that of a film having a thickness of at least 5 μm reached at least 60%, thereby providing a satisfactorily high visible light photocatalytic activity.

INDUSTRIAL APPLICABILITY

A titanium oxide-based photocatalyst and a photocatalytic functional product according to the present invention can be mass-produced efficiently and exhibit a high photocatalytic activity by irradiation not only with ultraviolet light but also with visible light. Compared to a conventional titanium oxide photocatalyst which is active with ultraviolet light, more effective utilization of light is made possible, so they are expected to have extremely potent photocatalytic activities and strong effects on environmental depollution. In addition, they make it possible to utilize a photocatalytic effect in those locations in which the quantity of ultraviolet light is so small that a conventional titanium oxide photocatalyst could not exhibit a satisfactory effect, such as locations oriented to the north or in the shade and the interior of a house in which substantially only the light of fluorescent lamps is usable.

The invention claimed is:

1. A titanium oxide-based photocatalyst which is characterized by comprising a titanium oxide and an additional metal compound, and developing a photocatalytic activity by irradiation with visible light, the additional metal compound comprising at least one metal halide.

2. The titanium oxide-based photocatalyst as set forth in claim 1 wherein the content of the additional metal compound as a metal is at least 0.1 mass % and at most 300 mass % based on the titanium oxide.

3. The titanium oxide-based photocatalyst as set forth in claim 1 wherein the metal is at least one selected from Ti, Si, V, Sn, Sb, W, Nb, Bi, P, Mo, Cs, Ge, As, and Ce.

4. The titanium oxide-based photocatalyst as set forth in claim 1 wherein the halide is a chloride.

5. The titanium oxide-based photocatalyst as set forth in claim 1 wherein the titanium oxide has absorptivity for visible light.

6. The titanium oxide-based photocatalyst as set forth in claim 1 wherein the titanium oxide has oxygen defects.

7. The titanium oxide-based photocatalyst as set forth in claim 1 wherein the primary crystal structure of the titanium oxide is anatase.

8. A photocatalytic functional product characterized by comprising a substrate having a titanium oxide-based photocatalyst as set forth in claim 1 deposited on a surface of the substrate.

9. A photocatalytic functional product characterized by comprising a substrate having a film which comprises a titanium oxide-based photocatalyst as set forth in claim 1 and a binder component formed on a surface of the substrate, the content of the photocatalyst in the film being 5-95 mass %.

10. A photocatalyst dispersion characterized by comprising a titanium oxide-based photocatalyst as set forth in claim 1 dispersed in a solvent.

11. A photocatalyst dispersion as set forth in claim 10 wherein the photocatalyst has an average particle diameter of at most 500 nm.

12. A photocatalytic coating fluid characterized in that it is prepared using a photocatalyst dispersion as set forth in claim 11.

13. A photocatalytic coating fluid characterized by comprising a titanium oxide-based photocatalyst as set forth in claim 1 in a solvent.

14. A photocatalytic coating fluid characterized by comprising a titanium oxide-based photocatalyst as set forth in claim 1 and a binder in a solvent, the content of the titanium oxide-based photocatalyst being in the range of 5-95 mass % based on the total nonvolatile content in the fluid.

15. A titanium oxide-based photocatalyst which is characterized by containing a metal halide in titanium oxide and having a thermal desorption spectrum in which a peak of a molecular ion or a fragment ion of a halogen-containing substance appears at a temperature of 623 K or higher.

16. A titanium oxide-based photocatalyst developing a photocatalytic activity by irradiation with visible light, which is characterized by having ESR spectrum measured at a temperature of at least 5 K in which a peak is observed in the range in which the g value is 1.950-2.030 when irradiated with visible light, that peak not being substantially observed in the dark.

17. The titanium oxide-based photocatalyst as set forth in claim 16 which has an ESR spectrum measured at a temperature lower than 77 K in which a peak appears in the range in which the g value is 1.986-1.994.

18. A titanium oxide-based photocatalyst developing a photocatalytic activity by irradiation with visible light, which is characterized by having an ESR spectrum measured at room temperature in a substantially oxygen-free atmosphere in which the highest peak observed in the range in which the g value is 1.950-2.030 when irradiated with visible light has a peak intensity with a half life of at least 3 minutes after the irradiation with visible light is stopped.

19. A titanium oxide-based photocatalyst prepared by a method for the preparation of a titanium oxide-based photocatalyst characterized in that titanium oxide and/or its precursor is brought into contact with a reactive medium containing a metal halide of the formula $MX_n$ or $MOX_n$ (wherein M=a metal, X=a halogen, and n=an integer).

* * * * *